(12) United States Patent
Yu et al.

(10) Patent No.: US 12,311,698 B2
(45) Date of Patent: May 27, 2025

(54) INTEGRATED AXLE ASSEMBLY AND STRUCTURAL ASSEMBLY

(71) Applicant: Jilin Weichuang Electromechanical Engineering Co., Ltd., Jilin (CN)

(72) Inventors: Jilong Yu, Jilin (CN); Ruiyuan Tian, Jilin (CN); Hongyu Zhu, Jilin (CN)

(73) Assignee: Jilin Weichuang Electromechanical Engineering Co., Ltd., Changchun (CN)

( * ) Notice: Subject to any disclaimer, the term of this patent is extended or adjusted under 35 U.S.C. 154(b) by 0 days.

(21) Appl. No.: 18/675,211

(22) Filed: May 28, 2024

(65) Prior Publication Data

US 2024/0399792 A1    Dec. 5, 2024

(30) Foreign Application Priority Data

May 29, 2023   (CN) .......................... 202310609020.8
May 23, 2024   (CN) ......................... 202410649247.X

(51) Int. Cl.
*B60B 35/04*   (2006.01)
*B60B 27/00*   (2006.01)
*B60B 35/08*   (2006.01)

(52) U.S. Cl.
CPC .............. *B60B 35/04* (2013.01); *B60B 35/08* (2013.01); *B60B 27/0057* (2013.01); *B60B 27/0063* (2013.01); *B60B 2310/202* (2013.01); *B60B 2320/10* (2013.01); *B60B 2900/111* (2013.01); *B60B 2900/112* (2013.01);
(Continued)

(58) Field of Classification Search
CPC ..... B60B 35/04; B60B 35/08; B60B 27/0057; B60B 27/0063; B60B 2310/202; B60B 2320/10; B60B 2900/111; B60B 2900/112; B60B 2900/113; B60B 2900/115; B60B 2900/321; B60B 2900/325; B60B 35/007; B60G 2202/152; B60G 7/001; B60G 2200/31; B60G 2204/20; B60G 2206/10;
(Continued)

(56) References Cited

U.S. PATENT DOCUMENTS 4,415,179 A * 11/1983 Marinelli ............... B60G 9/003
                                                            280/683
5,909,888 A *  6/1999 Betz .................... B60G 21/051
                                                         280/124.166
(Continued)

FOREIGN PATENT DOCUMENTS

GB    2355698 A  *  5/2001  ............. B60B 35/08
GB    2396140 A  *  6/2004  ............. B60G 11/28

*Primary Examiner* — Paul N Dickson
*Assistant Examiner* — Shams Dhanani

(57) ABSTRACT

Provided discloses an integrated axle assembly and structural assembly. The integrated axle assembly comprises an axle tube assembly extending in a first direction; a front support arm extending circumferentially from the axle tube assembly in a second direction perpendicular to the first direction for attachment to the frame; a rear support arm extending circumferentially from the axle tube assembly in a third direction away from the second direction for mounting a resilient assembly; and a brake base plate extending in a peripheral direction from the circumference of the axle tube assembly; the axle tube assembly, front bracket arm, rear bracket arm and brake base plate are molded in one piece, which improves the assembly efficiency.

33 Claims, 28 Drawing Sheets

(52) U.S. Cl.
CPC ... *B60B 2900/113* (2013.01); *B60B 2900/115* (2013.01); *B60B 2900/321* (2013.01); *B60B 2900/325* (2013.01)

(58) Field of Classification Search
CPC ............ B60G 2206/31; B60G 2206/32; B60G 2206/8101; B60G 2300/02; B60G 9/003
See application file for complete search history.

(56) References Cited

U.S. PATENT DOCUMENTS

| | | | | |
|---|---|---|---|---|
| 7,360,774 | B2* | 4/2008 | Saieg | B60G 7/001 |
| | | | | 280/124.13 |
| 7,900,942 | B2* | 3/2011 | Koschinat | B60G 7/008 |
| | | | | 280/124.128 |
| 8,317,211 | B1* | 11/2012 | Ryshavy | B60G 9/003 |
| | | | | 280/124.175 |
| 8,764,123 | B2* | 7/2014 | Schmitz | B60G 9/003 |
| | | | | 301/124.1 |
| 2002/0135225 | A1* | 9/2002 | Dantele | B60B 35/08 |
| | | | | 301/124.1 |
| 2007/0069496 | A1* | 3/2007 | Rinehart | B21D 53/88 |
| | | | | 280/124.106 |
| 2011/0001350 | A1* | 1/2011 | Schmitz | B60G 9/003 |
| | | | | 301/124.1 |
| 2014/0131969 | A1* | 5/2014 | Rowe | B60G 21/055 |
| | | | | 280/124.106 |
| 2020/0247183 | A1* | 8/2020 | Macken | F16D 1/072 |
| 2021/0206225 | A1* | 7/2021 | Casali | B60G 21/052 |

\* cited by examiner

INTEGRATED AXLE ASSEMBLY AND STRUCTURAL ASSEMBLY

CROSS-REFERENCE TO RELATED APPLICATION

The present application claims priority to Chinese Patent Application No. 202310609020.8, filed on May 29, 2023, the content of which is incorporated herein by reference in its entirety.

The present application claims priority to Chinese Patent Application No. 202410649247.X, filed on May 23, 2024, the content of which is incorporated herein by reference in its entirety.

FIELD

The present disclosure relates to the field of automotive technology, and in particular to an integrated axle assembly.

BACKGROUND

As shown in FIG. 1, the prior art trailer axle housing assembly consists of an axle tube assembly 1, a guide arm assembly 2, and a bolted ABS bracket 3, wherein the axle tube assembly 1 consists of an axle tube body 11, a brake base plate 12, and a half-axle casing 13 welded together. The guide arm assembly 2 consists of an anti-breakage plate assembly 21, a U-shaped bolt 22, a guide arm pressure plate 23, a guide arm 24, an axle lower bracket 25 and an axle upper bracket 26, etc., wherein the parts of the anti-breakage plate assembly 21, the guide arm 24, the axle upper bracket 26, the axle lower bracket 25, etc. are connected to the axle tube assembly 1 mainly through the U-shaped bolt 22, and there exists the product connecting with a large number of parts, the operation is complex, and the bolts are easy to be loosened, high risk of failure, large overall weight and other defects.

In the process of realizing the prior art, the inventor found:

The axle housing assembly on the trailer nowadays has the problems of numerous product connection parts, complicated operation, easy loosening of bolts, high risk of failure, and large overall weight.

SUMMARY

Embodiments of the present disclosure provide an integrated axle assembly to solve the above problems raised in the background technology.

In order to realize the above object, the present invention provides the following technical solution: an integrated axle assembly comprising an axle tube assembly and a guide arm assembly, said guide arm assembly comprising:

a front support arm, said front support arm being cast integrally with the axle tube assembly;

a rear support arm, said rear support arm being fixedly connected to a side of the axle tube assembly away from the front support arm;

said rear support arm is pinned and bolted to the axle tube assembly, and said rear support arm comprises an upper support plate, a lower support plate, an upper fixed seat, a lower fixed seat and a gas spring transition plate mounting tab, said upper fixed seat and lower fixed seat are fixedly connected to the same end of the upper and lower support plates, said upper support plate is fixedly connected to the lower fixed seat and the gas spring transition plate mounting tab is connected to the upper support plate at an end away from the upper fixed seat, said upper support plate is fixedly connected to the lower fixed seat, and said gas spring transition plate mounting tab is connected to the upper support plate at an end away from the upper fixed seat. away from one end of the upper fixed seat, the bottom end of said gas spring transition plate mounting tab is fixedly connected to one end of the lower support plate away from the lower fixed seat, the thickness of said upper support plate and lower support plate cross-section is gradually thinning and narrowing from the root to the front end, and the thickness of said lower support plate is greater than the thickness of the upper support plate;

wherein a middle reinforcing bar fixedly connected in the middle between said upper supporting plate and lower supporting plate, and there is a front reinforcing bar on the side of said middle reinforcing bar far away from the lower fixing seat, and the two ends of said front reinforcing bar are respectively fixedly connected with the opposite sides of the upper supporting plate and the lower supporting plate, and there is a bottom reinforcing bar on the side of said middle reinforcing bar far away from the front reinforcing bar, and the bottom reinforcing bar is fixedly connected to the outer walls of the lower supporting plate and the lower fixing seat on the bottom and the one side respectively, said bottom reinforcing bar is fixedly connected to the outer wall of the lower support plate and the lower fixing seat respectively, and said rear reinforcing bar is fixedly connected between said lower fixing seat and the upper support plate;

said rear reinforcement bar is connected to the root of the upper support plate at a forward position, and said rear reinforcement bar and the outer wall of the connection between the lower support plate and the lower fixed seat are provided with chamfered corners.

Further, said outer wall of said front support arm is provided with a first skeleton at a position of a connection section with the axle tube assembly, said front support arm is provided with a rounded first corner for transition at the connection section with the axle tube assembly, said upper wall of said front support arm is provided with a first cut corner at a position corresponding to the upper wall of the axle tube assembly, said lower wall of said front support arm is provided with a second cut corner at a position corresponding to the lower wall of the axle tube assembly, provided with a second cut corner.

Further, said front carrier arm comprises a shock absorber seat, a sand outlet, a reinforcing bar and a front carrier arm body, said sand outlet being provided in the middle of the front carrier arm body, said protrusions being provided in the inner and outer walls of the front carrier arm body and located at the port positions at both ends of the sand outlet, said shock absorber seat being provided in the front carrier arm body at a position close to the end of the axle tube assembly, said reinforcing bar being provided in the front carrier arm body at a position corresponding to the upper wall of the axle tube assembly and the lower wall of the axle tube assembly, reinforcement is provided on the outer wall of one end of the front support arm body away from the shaft tube assembly.

Further, said axle tube assembly is cast integrally from an axle tube body, a brake base plate, a half-axle sleeve and an ABS bracket seat, and said half-axle sleeve is set with different wall thicknesses according to the load and force conditions.

Further, said axle tube assembly is of eccentric circle design, said upper and lower walls of said axle tube body cross-section can be realized with different wall thicknesses of different sizes, and said axle tube assembly can be adjusted with wall thicknesses by changing the inner and outer diameters of its inner and outer circles and the centroid distance of the eccentric circle.

Further, the height of the upper surface of said gas spring transition plate mounting tab is higher than the height of the upper surface of the upper support plate, and said gas spring transition plate mounting tab is provided with gas spring bolt mounting holes and two gas spring transition plate mounting holes, respectively, and said gas spring bolt mounting holes are disposed between the two gas spring transition plate mounting holes.

Further, the present disclosure further provides an integrated axle assembly characterized in that said integrated axle assembly comprises:
- an axle tube assembly extending in a first direction;
- a front support arm extending circumferentially from the axle tube assembly in a second direction perpendicular to the first direction for attachment to the frame;
- a rear support arm extending circumferentially from the axle tube assembly in a third direction away from the second direction for mounting a resilient assembly;
- and a brake base plate extending in a peripheral direction from the circumference of the axle tube assembly;
- said axle tube assembly, front bracket arm, rear bracket arm and brake base plate are molded in one piece.

Further, said axle tube assembly is longitudinally cylindrical.

Further, said axle tube assembly is a longitudinally square cylinder.

Further, said axle tube assembly is a longitudinal I-bar.

Further, said axle tube assembly is a longitudinal groove structure.

Further, said axle tube assembly is a longitudinal groove structure, and the groove is provided with a network of distributed reinforcement bars.

Further, said axle tube assembly is a longitudinal groove structure, and the cross-section of the groove structure is a three-sided encompassing structure.

Further, said groove opening is oriented in a third direction or towards the frame.

Further, said front support arm is provided as a hollow cylinder structure with reinforcement bars at appropriate positions.

Further, said front support arm is provided as a groove structure having a first groove wall and a second groove wall extending in a second direction, and transverse reinforcement bars connecting the first groove wall and the second groove wall.

Further, said front support arm is provided as a recess structure having a first groove wall and a second groove wall extending in a second direction, a transverse reinforcing bar connecting the first groove wall and the second groove wall, and a longitudinal reinforcing bar extending in a direction substantially in line with the direction of the first groove wall.

Further, said front support arm has a hollow cylinder structure.

Further, said front support arm adopts an I-bar structure.

Further, said front support arm adopts a longitudinal groove, and a folded edge structure is provided on both sides of the groove wall.

Further, said rear support arm is a horn structure which gradually contracts along the third direction space.

Further, said rear support arm adopts a groove structure, having a third groove wall and a fourth groove wall extending along the third direction, and a transverse reinforcement connecting the third groove wall and the fourth groove wall.

Further, said rear support arm adopts a groove structure and the rear support arm is set up as a prismatic projection structure, the prismatic projection extends in the third direction and splits into two at an appropriate position to form a fork-shaped prismatic projection.

Further, said rear support arm is provided as a structure having a bottom wall, a top wall, and an intermediate wall in connecting a middle part of the bottom wall to a middle part of the top wall.

Further, said axle tube assembly comprises two segments nested together in a sleeve.

Further, said rear support arm is threaded to mate with the axle tube assembly and has at least two mounting positions.

Further, said rear support arm integrates a mount for a damper.

Further, said rear support arm is provided with mounting holes for the damper.

Further, said brake base plate for mounting brake shoes for drum brakes or caliper brackets for mounting disc brakes.

Further, the present disclosure further provides a structural assembly having the integrated axle assembly, said structural assembly further comprises:
- a damper for mating with the frame at one end and mating with the integrated axle assembly at the other end;
- an air spring assembly carried on the rear support arm and for mating with the frame.

Further, said structural assembly further comprises:
- a brake mated to a brake base plate;
- a linkage system mounted to the axle tube assembly, mating with the brake and selectively switching the brake between a braked state and a free state;
- an air chamber mated to the linkage system and providing braking force.

Further, said brake comprises:
- a brake drum coupled to a brake base plate;
- a brake shoes embedded in the brake drum and oscillating relative to the inner wall of the brake drum;
- a reset spring providing a resetting force for the brake shoe;
- a camshaft mounted to the brake base plate and driving the brake shoe to oscillate.

Further, said brake comprises:
- a caliper bracket connected to the brake base plate;
- a brake disk partially seated into the caliper bracket;
- a caliper mounted to the caliper bracket, selectively proximate or remote from the brake disk.

The technical solutions provided in the embodiments of the present disclosure have at least the following beneficial effects:

The axle assembly provided by the present invention is made by casting the axle tube and the front support arm as a whole, and the rear support arm is pin positioned, bolted, or the rear support wall is cast together, so that the product structure of the present invention is simple and reliable, reduces the difficulty of assembly operation, reduces the risk of loosening of the bolted connection, reduces the failure coefficient, and saves the cost: at the same time, the overall casting process, it is convenient to optimize the thickness of the product, and under the circumstance of guaranteeing the quality of the product, the weight of the product can be effectively reduced, and end customers can increase the revenue of more cargo. Reduce the weight of the product, the end customer can carry more goods, increase revenue.

BRIEF DESCRIPTION OF DRAWINGS

The accompanying drawings described here are used for providing a further understanding of the present disclosure, and constitute a part of the present disclosure. The schematic embodiments of the present disclosure and the descriptions thereof are used for interpreting the present disclosure, rather than constituting improper limitations to the present disclosure. In the accompanying drawings.

DETAILED DESCRIPTION

Figure 1:
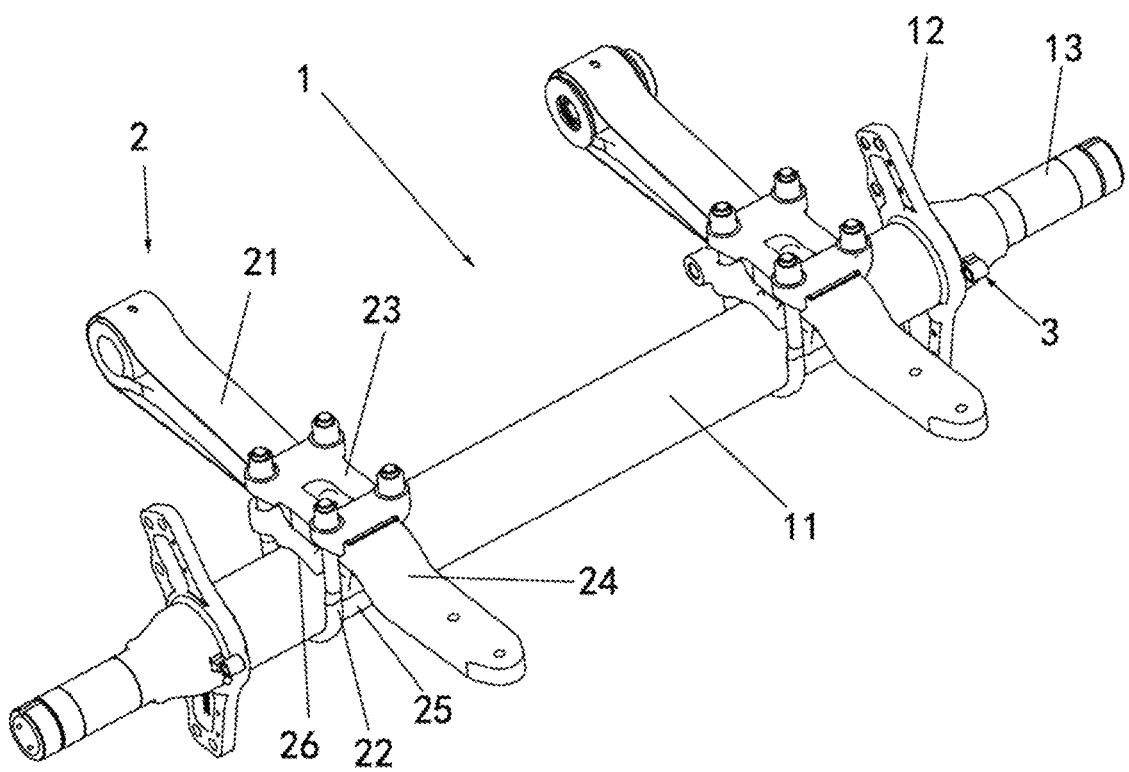
FIG. 1 shows a schematic structural diagram of an axle housing assembly in a prior art solution relative to embodiments of the present application.
Figure 2:
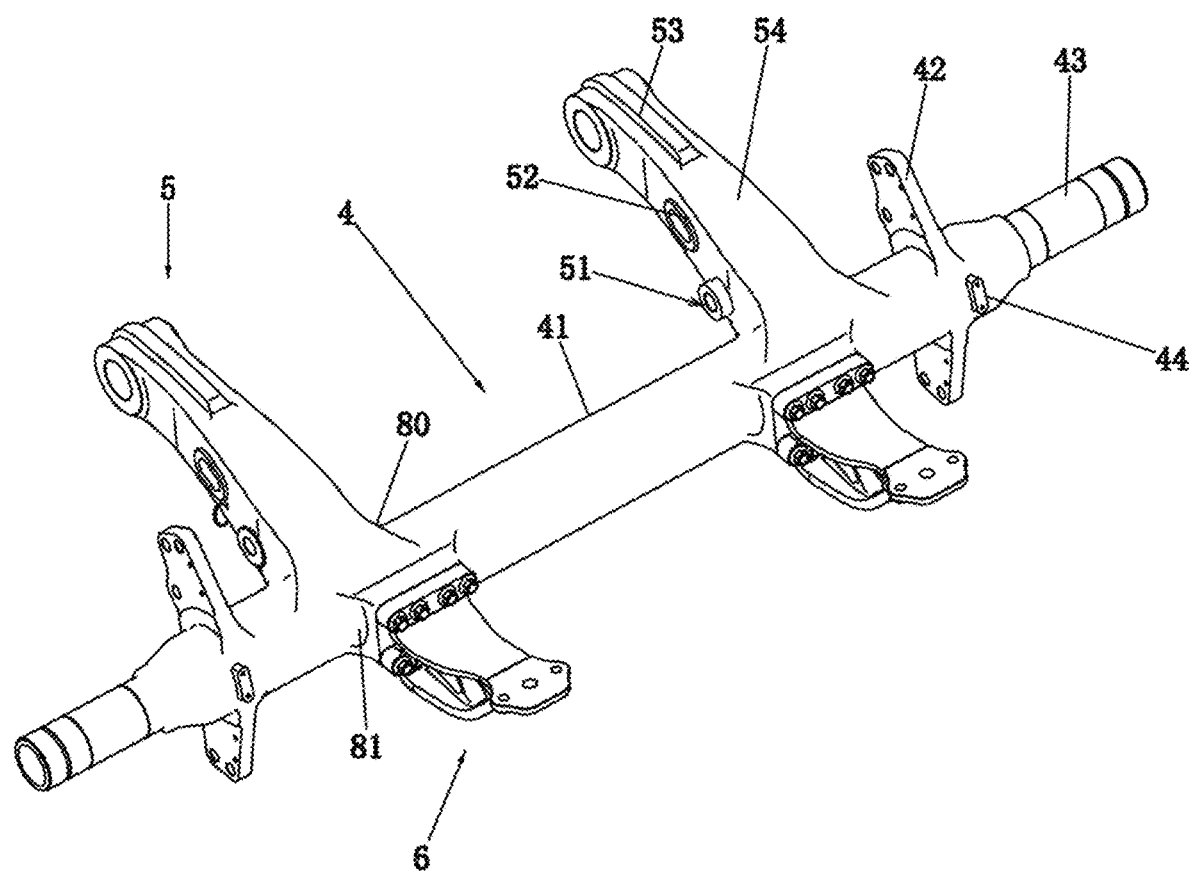
FIG. 2 shows a three-dimensional structural schematic diagram of the axle tube assembly of the present application pin-located and bolt-fastened with the rear support arm.
Figure 3:
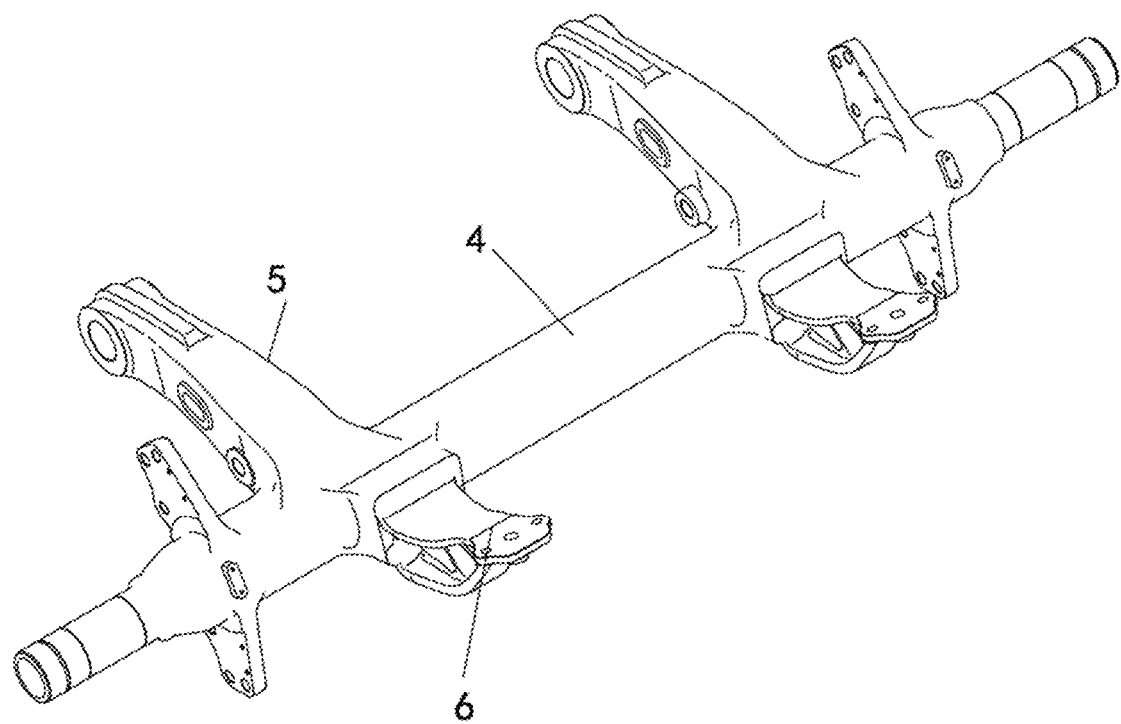
FIG. 3 shows a three-dimensional structural schematic diagram of the axle tube assembly of the present application and the rear support arm cast in one piece.
Figure 4:
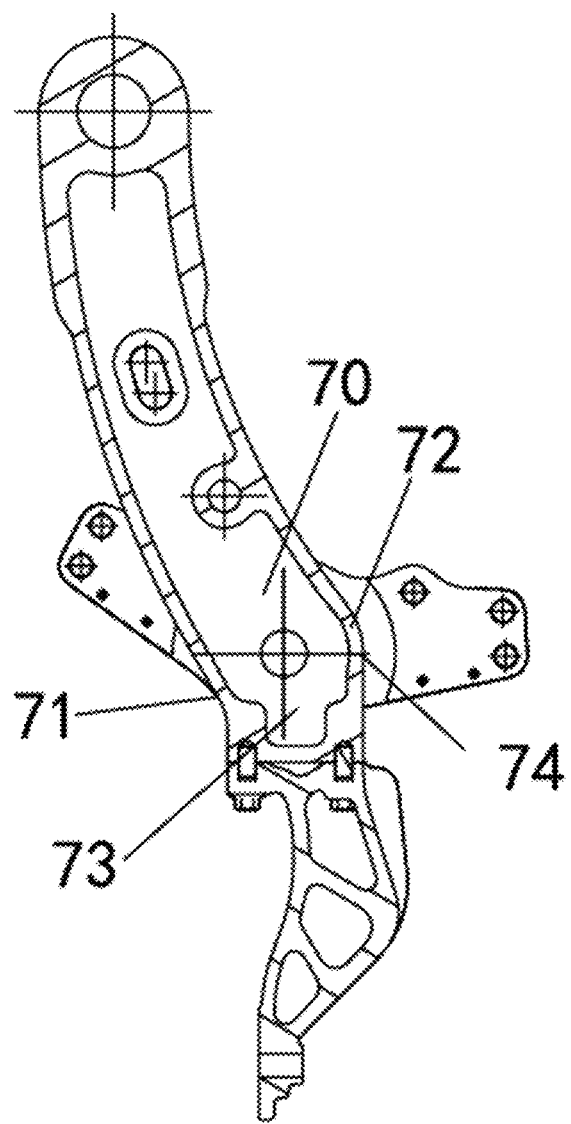
FIG. 4 shows a schematic diagram of the sectional structure at the center of the front support arm and the rear support arm of the present application.
Figure 5:
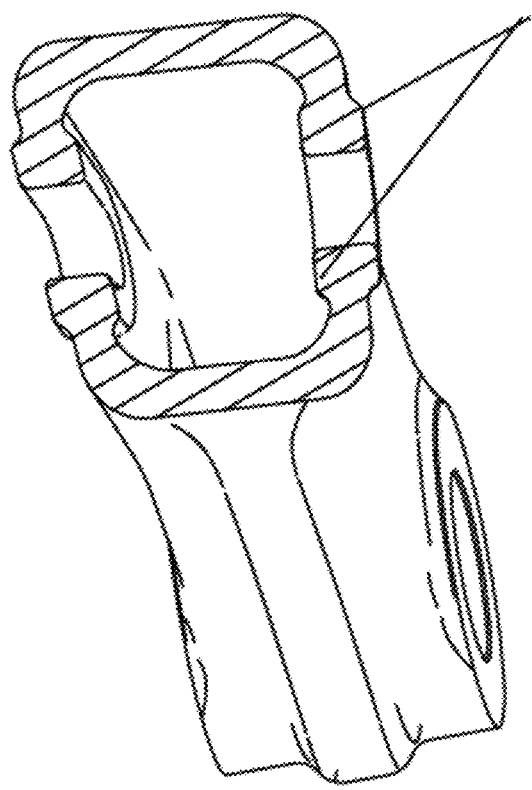
FIG. 5 shows a schematic diagram of the sectional structure at the sand outlet of the front support arm of the present application.
Figure 6:
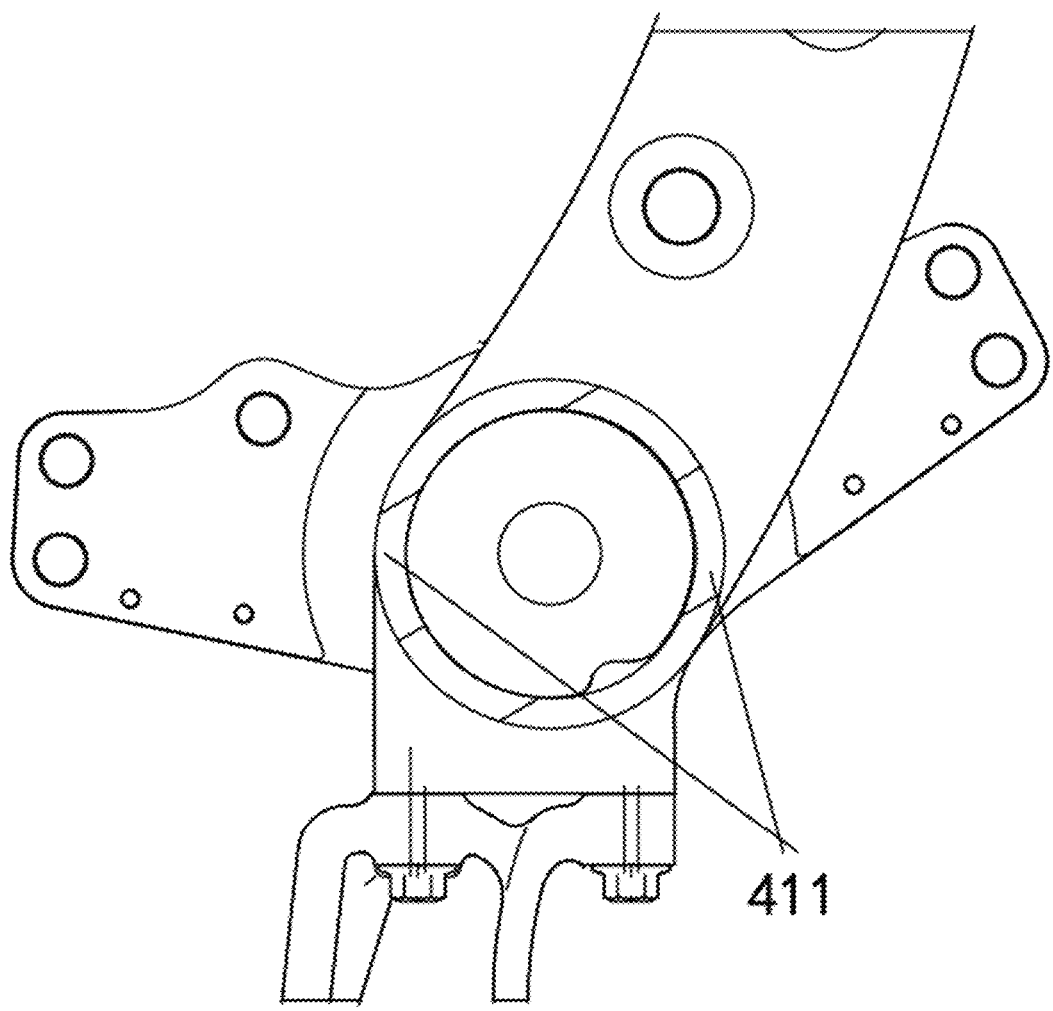
FIG. 6 is a schematic diagram of the cross-sectional structure of the axle tube body of the present application.
Figure 7:
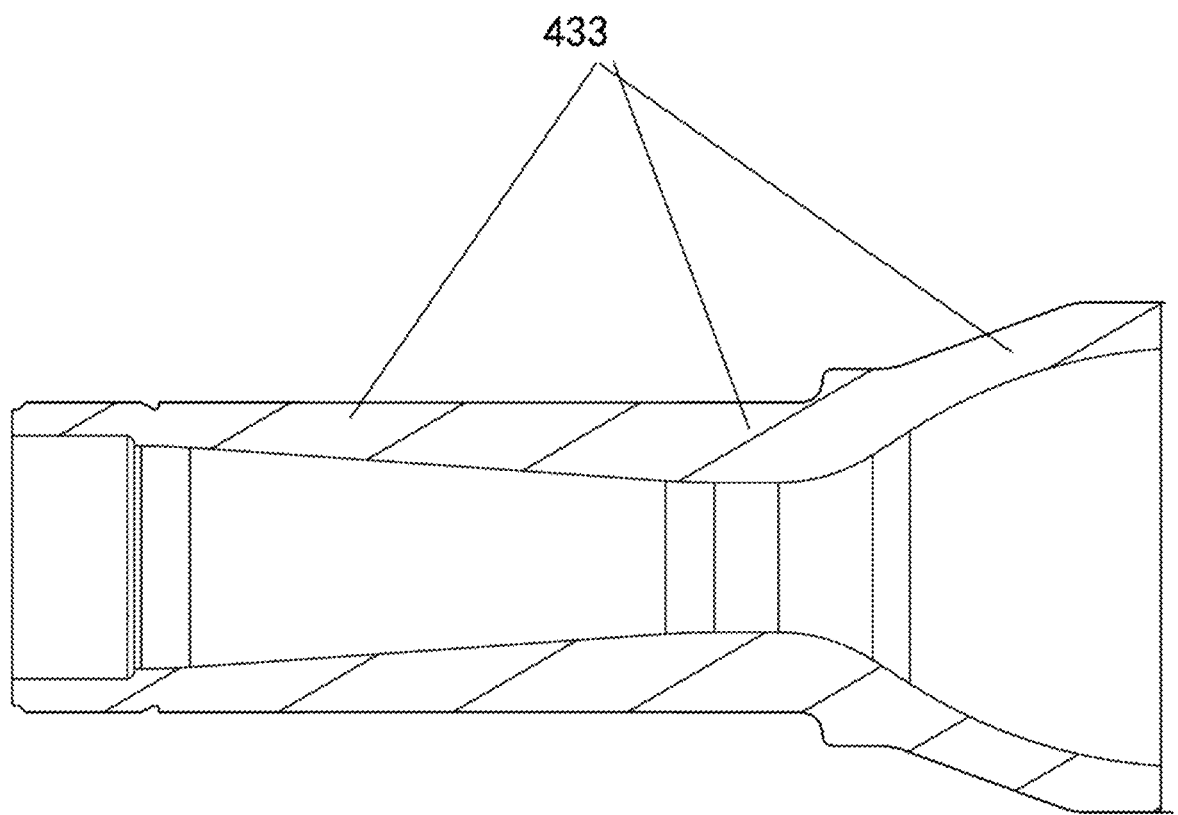
FIG. 7 is a schematic diagram of the cross-sectional structure of the half shaft casing of the present application.
Figure 8:
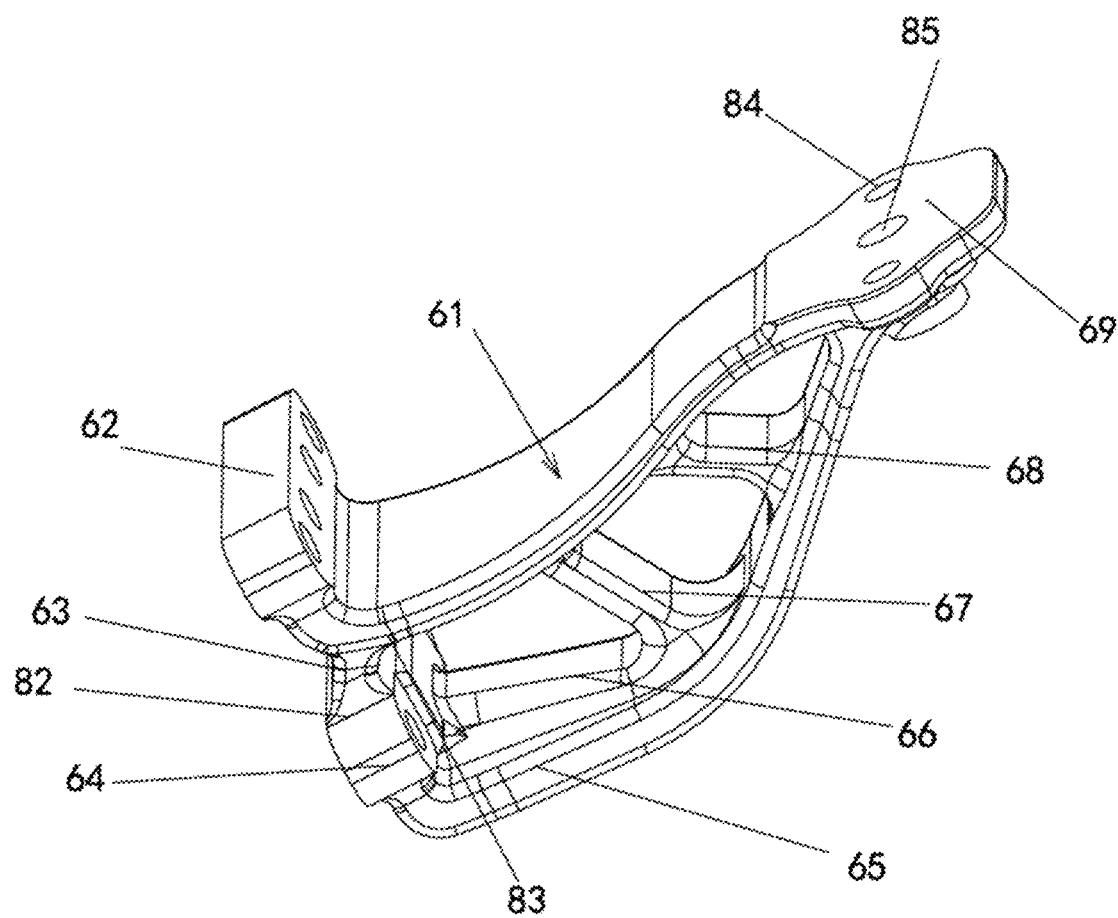
FIG. 8 shows a schematic diagram of the three-dimensional structure of the rear support arm of the present application.

In order to make the purpose, technical solutions and advantages of the present application clearer, the technical solutions of the present application will be described clearly and completely in the following in combination with specific embodiments of the present application and the corresponding accompanying drawings. Obviously, the described embodiments are only a part of the embodiments of the present application, and not all of the embodiments. Based on the embodiments in the present application, all other embodiments obtained by the person of ordinary skill in the field without making creative labor are within the scope of protection of the present application.

An automobile includes a vehicle chassis, a body carried on the vehicle chassis, and electrical appliances mounted on the body and vehicle chassis.

The function of the automobile chassis is to support and mount the engine and various other parts and assemblies of the automobile, which in turn constitute the automobile as a whole. The power generated by the engine is transmitted to the drive wheels after deceleration and torque increasing to drive the automobile as a whole forward or backward. The automobile chassis is equipped with steering control, brake control and vibration damping buffer and other devices to ensure that the vehicle runs normally.

The automobile chassis consists of a transmission system, a traveling system, a steering system and a braking system.

Specifically, the power of the automobile is generated by the engine, and is transmitted to the driving wheels through the clutch, transmission, universal transmission device, and differential and half shaft installed in the drive axle, etc.

The transmission system includes the clutch, transmission, universal drive, and drive axle.

The clutch is located between the engine and transmission, is the automobile transmission system directly connected to the engine components, can be connected or cut off the engine power.

The actual use of the car is very complex, such as starting, idling and parking, low or high speed driving, acceleration, deceleration, hill climbing and reversing. These working conditions require that the driving force and speed of the car can be changed within a considerable range, and the widely used piston engine output torque and speed change range is small, in order to adapt to the varying driving conditions, and make the engine work in favorable conditions, set up a transmission in the drive system.

In actual use, the output shaft of the transmission and the input shaft of the drive axle, it is difficult to drive in a straight line, and in the process of automobile use, due to the impact of uneven road surface and other factors cause vibration, so the output shaft of the transmission and the input shaft of the drive axle can not be rigidly connected, and thus a universal transmission device must be used.

The main function of the drive axle is to transfer the engine power or torque from the universal drive to the driving wheels by means of speed reduction and torque increasing. The drive axle is the most end assembly in the automobile transmission system, and it is equipped with drive wheels on both sides. The drive axle can be arranged at the front side of the vehicle, at the rear side of the vehicle or at both the front and rear sides of the vehicle.

The drive axle includes a drive axle housing and a differential and a half shaft installed in the drive axle housing.

In addition to the differential and the half shaft, a main reducer is usually provided in the drive axle to realize speed reduction and torque increase. At the same time, the main reducer can change the direction of torque transmission. In the drive axle of a vehicle with a transverse engine arrangement, the main reducer is often a simple helical cylindrical gear. In the longitudinal arrangement of the engine on the drive axle, the main gear reducer tends to use bevel gears and hypoid gears and other forms. The main reducer decelerates the speed output from the transmission again to increase the torque, after which the power is transferred to the differential. For rear-wheel drive vehicles, such as passenger cars and trucks, the main reducer and differential are mounted in the rear drive axle, forming one large assembly.

The differential realizes the differential speed of the wheels on both sides to meet the needs of the inner and outer wheels rotating at different speeds.

The drive wheels are connected to the differential by half shafts, in other words, half of the axle between the two drive wheels.

The main reducer housing of the drive axle housing covers the main reducer and differential. The half shaft casing of the drive axle housing covers the half shaft.

When the half shaft casing and the main reducer shell rigidly integrated, both sides of the half shaft and the drive wheel can not be in the transverse plane to do relative movement, we call this drive axle housing for the integral drive axle housing or non-disconnect drive axle housing. Integral drive axle housing has greater strength and rigidity, easy to assemble and adjust the main gearbox and maintenance, so it is commonly used in various types of automobiles. Integral drive axle housing has large stiffness, high strength, easy to cast into the shape of equal-strength beams, but because of the large mass, casting quality is not easy to ensure that it is suitable for medium and heavy-duty vehicles, and is currently mainly used in heavy-duty vehicles.

In order to improve the smoothness of automobile driving and passability, some passenger cars all or part of the drive wheels using independent suspension, that is, the two sides of the drive wheels are connected to the frame with elastic suspension, the two drive wheels can be independent of each other relative to the frame up and down jump. Correspondingly, the main gearbox housing is fixed on the frame, the main gearbox housing and half shaft casing segmented and connected by hinges, this drive axle housing is called disconnected drive axle housing or segmented drive axle housing. Segmented drive axle housing is generally divided into two segments, and the two segments are bolted together as a single unit. Segmented drive axle housing than the whole drive axle housing is easy to casting, processing is simple, but maintenance is not convenient. When disassembling and inspecting the main reducer, the entire drive axle must be removed from the car.

The traveling system connects the various assemblies and parts of the car into a whole, supports the mass of the whole car, and ensures that the car moves.

The traveling system includes the frame for mounting the drive train, the wheels, the steering axle for limiting the relative motion of the wheels with respect to the frame, and the suspension for limiting the motion of the wheels with respect to the frame or body.

The frame is a support that can be used to mount the steering gear, the leaf springs, the fuel tank, the gas tank, the battery, the spare tire, the water tank and the like. The specific realization of the frame can be divided into side-beam frame, platform frame and ridge-beam frame.

The side-beam frame is a rigid structure consisting of two longitudinal beams located on both sides and a number of cross beams riveted or welded together. Because the side beam frame is easy to install the body and arrange the assembly, which is favorable for the modification and development of multi-species models, so it is widely used.

The longitudinal beam of the side beam frame is usually made of low carbon alloy steel plate stamping. Its cross-section shapes include groove cross-section, box cross-section, Z-shaped cross-section and I-shaped cross-section. According to the requirements of automobile form and structural arrangement, the longitudinal beam can be made into curved, isotropic or non-isotropic section in the horizontal plane or longitudinal plane.

The longitudinal beam has many forms, including narrow front and wide rear structure, wide front and narrow rear structure and front and rear equal width structure, as well as parallel structure and curved structure.

The frame cross member is not only used to ensure the torsional stiffness of the frame and bear the longitudinal load, but also used to support the main components of the car, such as the radiator, engine, cockpit, driveshaft, spare tire carrier and suspension.

The wheel is a rotating component that carries the load between the tire and the axle, and generally consists of a hub, spokes and rim.

Steering axle mainly consists of front axle, steering knuckle and main pin, cooperating with wheel hub and steering system to realize steering function. The front axle is the main body of the steering axle, and its cross-section shape has I-beam or tube shape.

The front axle of the steering axle is used to reduce the height of the engine, thus lowering the center of gravity of the car, expanding the driver's field of vision, and reducing the angle between the drive shaft and the output shaft of the transmission.

The steering knuckle is the hinge on which the wheels are steered, and is a fork-shaped piece. The upper and lower forks of the fork-shaped piece have two holes with the same axis for installing the main pin.

The role of the main pin is to hinge the front axle and the steering knuckle, so that the steering knuckle swings around the main pin to realize the wheel steering.

The main function of the suspension is to transfer the supporting force, driving force, braking force and lateral reaction force acting on the wheels on the road surface and the moment formed by these reaction forces to the frame or load-bearing body to ensure that the car is traveling normally.

According to whether the wheel movements on both sides of the car are related to each other, the automobile suspension can be divided into non-independent suspension and independent suspension.

Non-independent suspension structure is characterized by the car on both sides of the wheels were installed in an integral axle at both ends, the axle is connected to the frame through the elastic element, when one side of the wheels due to the road is not level and jumping, will affect the other side of the wheel work.

The structure of independent suspension is characterized by the two sides of the wheels were installed in the disconnected axle ends, each section of the axle and wheel alone through the elastic element connected to the frame, when one side of the wheels jump, the other side of the wheels do not have an impact, so it is called independent suspension.

The front wheels of independent suspension can be adjusted for their positioning, so they are widely used in passenger cars, while non-independent suspension is commonly used in medium and heavy commercial vehicles because of its simple structure, easy manufacturing and maintenance.

The steering system ensures that the car is driven according to the driver's will. When the car is traveling on the road, the driver can turn the steering wheel to make the steering wheel deflect according to the road and traffic conditions, and change the driving direction of the car. The mechanism used to change or maintain the direction of travel is called the automobile steering system. The function of the steering system is to control the traveling direction of the car according to the driver's wishes.

The braking system forces the automobile to slow down and stop and park safely in various places according to the needs of automobile traveling. The main function of the braking system is to enable the driver to control the braking force according to the road and traffic, etc., in order to realize a certain degree of forced braking, so that the car decelerates or stops; to ensure that the car travels at a stable speed when driving downhill; and to ensure that the car stops reliably in situ, which also includes stopping on the ramp.

Drum brakes utilize brake shoes to squeeze the wheel hub and obtain braking force, and can be divided into internal tensioned type and external beam type. Internal tension drum brakes use the inner cylindrical surface of the wheel hub as the working surface and are widely used in modern automobiles, while external beam drum brakes use the outer cylindrical surface of the wheel hub as the working surface and are currently only used as parking brakes for very few automobiles.

In order to more clearly illustrate the differences between the technical solutions of the present application relative to the prior art, the technical solutions employed in the prior art are revealed in FIG. 1. Referring again to FIG. 1, a trailer axle housing assembly comprises an axle tube assembly 1 on both ends where wheels can be mounted, a guide arm assembly 2 mounted in a circumferential direction of the axle tube assembly 1, and a brake base plate 12 mounted in an axial direction of the axle tube assembly 1.

The axle tube assembly 1 can encompass a half shaft inside, and wheels are mounted at both ends of the axle tube assembly 1.

In a specific realization form, one side of the guide arm assembly 2 may be indirectly connected to the frame by a linkage structure. An air spring assembly may be mounted on the opposite side of the guide arm assembly 2, and the frame is supported by the air spring assembly. The axle tube assembly 1 passes through the guide arm assembly 2 in the middle, thereby securing the guide arm assembly 2 to the axle tube assembly 1 in a circumferential direction.

The axle tube assembly 1 also passes through a plate-like brake base plate 12, which is axially secured to the axle tube assembly 1 by the ABS bracket.

It is to be understood that, according to the aforementioned overall description of the vehicle structure, the axle tube assembly 1 can be categorized as an axle structure bridging the wheels on both sides, i.e. as an ordinary axle that does not have an automotive power transmission function in the vehicle's driving system. The guide arm assembly 2 may be considered to belong to a suspension structure, i.e., to be classified as a suspension in the driving system of the vehicle. The brake base plate 12, on the other hand, may be categorized as a brake mounting structure in the braking system of the vehicle.

The present application breaks the boundary between the traveling system and the brake system structure in the prior art, and breaks the boundary between the axle structure and the suspension structure in the traveling system in the prior art, and casts as many parts and components as possible in one piece, which on the one hand can reduce the workload of assembly, and on the other hand, the structure of the one-piece casting has a good consistency of the internal mechanical properties, which is not easy to be damaged in the process of use.

The present invention provides an integrated axle assembly as shown in FIGS. 2-8, including an axle tube assembly 4 and a guide arm assembly. The axle tube assembly 4 comprises an axle tube body 41, a brake base plate 42, a half-shaft casing 43, and an ABS bracket holder 44 cast in one piece. And this axle tube assembly 4 adopts one-piece casting to make the production process simple, to reduce the intensity of the work and to reduce the dimensional deviation caused by the welding and positioning, to reduce the non-conformity rate to avoid unnecessary waste, cost savings. Brake base plate 42 can be used disc brake base plate or drum brake base plate. Half shaft casing 43 wall thickness varying from 23 mm to 13 mm, the value set according to the bridge load requirements, the program can make the half shaft casing 43 segments of the force uniformity, do not produce strength over the area, increase the total number of cases. Half shaft casing 43 according to the load and force set up with unequal wall thickness 433, can also be designed according to the trailer load into different values of unequal wall thickness (gradient wall thickness) 433, can ensure the safety of the product strength at the same time to reduce the weight of the product. The axle tube assembly 4 according to the characteristics of its upper wall under pressure, the lower wall under pressure, can be used in the design of the eccentric circle, the formation of different up and down the wall thickness of 411 to meet the reasonable design of the wall thickness of 411, can increase the utilization rate of the material to achieve the control of weight. Moreover, the axle tube assembly 4 can realize the adjustment of the wall thickness 411 (including the realization of equal wall thickness) by changing the inner and outer diameters of the axle tube assembly 4 and the centroid distance of the eccentric circle, so as to meet the use of vehicles of different load levels.

The guide arm assembly includes a front support arm 5 and a rear support arm 6, and the axle tube assembly 4 may be cast integrally with the front support arm 5 and pinned and bolted to the rear support arm 6; or the axle tube assembly 4 may be cast integrally with both the front support arm 5 and the rear support arm 6.

The front support arm 5 and the shaft tube assembly 4 is a one-piece casting, the front support arm 5 outer wall and the shaft tube assembly 4 is set in the position of the connection part of a first hollow 70, easy to cast sand, easy to produce, reduce the difficulty of the process. The connection part of the front support arm 5 is set to the transition of a rounded first corner 80. The connection part of the front support arm 5 to the transition of the rounded first corner 80, can be guaranteed under the premise of the strength of the connection as far as possible reduce the weight of the product to increase end-user revenue. The upper and lower walls of the front support arm 5 and the upper and lower walls of the axle tube assembly 4 are respectively provided with a first cut corner 71 and a second cut corner 72 to ensure good connection strength of the front support arm 5 and improve product quality. The front support arm 5 consists of a shock absorber seat 51, a sand outlet 52, a reinforcement bar 53, and a front support arm body 54. And the sand outlet 52 is provided on the front support arm body 54, which is convenient for casting the sand and easy to produce, reducing the process difficulty. reducing process difficulty. The sand outlet 52 is located in the position of the inner and outer wall of the front arm 5 is set up with bumps 521 to strengthen. The thickness and width of bumps 521 can be adjusted according to the size of the sand outlet 52 and the stress situation of the front arm 5. The shock absorber seat 51 is set up in the lower wall of the front arm 5 close to the position of the side wall of the axle tube assembly 4. The shock absorber seat 51 close to the lower wall of the front arm 5 is conducive to the molding of the core, and is conducive to the realization of the process. The reinforcement bar 53 is set at the head position of the front support arm 5 for strengthening the head strength of the front support arm 5, and the width, thickness and extension length of the reinforcement bar 53 can be adjusted according to the load registration to match the needs of different load trucks.

The rear support arm 6 is set on the side of the axle tube assembly 4 away from the front support arm 5. The rear support arm 6 and the axle tube assembly 4 are fixed by pin positioning and bolt fastening. The axle tube assembly 4 and the rear support arm 6 form the axle housing assembly by the form of pin positioning and bolt fastening. The pins play the role of assembling and positioning at the same time, but also strengthen the shear strength in the direction of the firmness, increase the overall safety, and better ensure the stability of quality of the product. At the same time, according to different gas spring, suspension height can be replaced with different rear support arm 6, increasing the flexibility of the axle assembly. The rear support arm 6 includes upper support plate 61, lower support plate 65, upper fixed seat 62, lower fixed seat 64 and gas spring transition plate mounting cam 69. The upper fixed seat 62 and lower fixed seat 64 are fixedly connected to the same end both of the upper support plate 61 and the lower support plate 65. The upper support plate 61 is fixedly connected to the lower fixed seat 64. The gas spring transition plate mounting tab 69 is fixedly connected to the upper support plate 61 and the lower support plate 65 away from the end of the upper fixed seat 62. The gas spring transition plate mounting tab 69 is machined on the surface of the head of the upper support plate 61, and the upper support plate 61 is a one-piece structure. The thickness of the upper support plate 61 and the lower support plate 65 cross-section is gradually thinned and narrowed from the root towards the front. And the thickness of the lower support plate 65 is greater than the thickness of the upper support plate, so as to achieve stress uniformity, reduce material waste, control costs and reduce weight, and increase the revenue of end customers.

Gas spring transition plate mounting tab 69 of the upper surface height is higher than the height of the upper surface of the upper support plate 61, which is conducive to machine processing, reduce stress concentration, to ensure the strength requirements. The gas spring transition plate mounting tab 69 were opened on the gas spring bolt mounting holes 85 and two gas spring transition plate mounting holes 84. The gas spring bolt mounting holes 85 is located in the gas spring transition plate mounting holes between the two holes 84, which can be adapted to the different gas spring installation methods.

A middle reinforcing bar 67 is fixedly connected in the middle between the upper support plate 61 and the lower support plate 65. A front reinforcing bar 68 is provided on the side of the middle reinforcing bar 67 away from the lower fixing seat 64 to fix the upper support plate 61 and the lower support plate 65. A bottom reinforcing bar 66 is fixedly connected at the top of the lower support plate 65 and fixedly connected with the middle reinforcing bar 67 and the lower fixing seat 64. And a rear reinforcing bar 63 is fixedly connected between the lower fixing seat 64 and the upper support plate 61. The rear reinforcing bar 63, the middle reinforcing bar 67, the front reinforcing bar 68 and the bottom reinforcing bar 66 are fixedly connected to the upper support plate 61, the overall strength between the upper support plate 61 and the lower support plate 65 can be increased, and the product quality can be improved. The rear reinforcement bar 63 is connected to the root of the upper support plate 61 at the forward position 83, which effectively strengthens the root of the upper support plate 61. The rear reinforcing bar 63, the lower support plate 65 and the lower fixing seat 64 are connected with a chamfer 82 on the outer wall, which reduces the weight of the product as much as possible under the premise of guaranteeing the strength of the product and increases the revenue of the end customer.

The rear support arm 6 and the axle tube assembly 4 can also be cast in one piece to further reduce the number of parts, simplify the structure, reduce weight and cost and improve production efficiency. The connection portion of the outer wall of the rear support arm 6 where it connects with the shaft tube assembly 4 is provided with a skeletonized second 73, which can facilitate sanding, reduce weight, be easy to produce, and reduce the difficulty of the process. The attachment portion of the rear support arm 6 is provided with a second rounded corner 81 for transition. The lower wall of the rear support arm 6 and the lower wall of the axle tube assembly 4 are provided with tangent flanges 74 to ensure good connection strength of the rear support arm 6.

Figure 9:
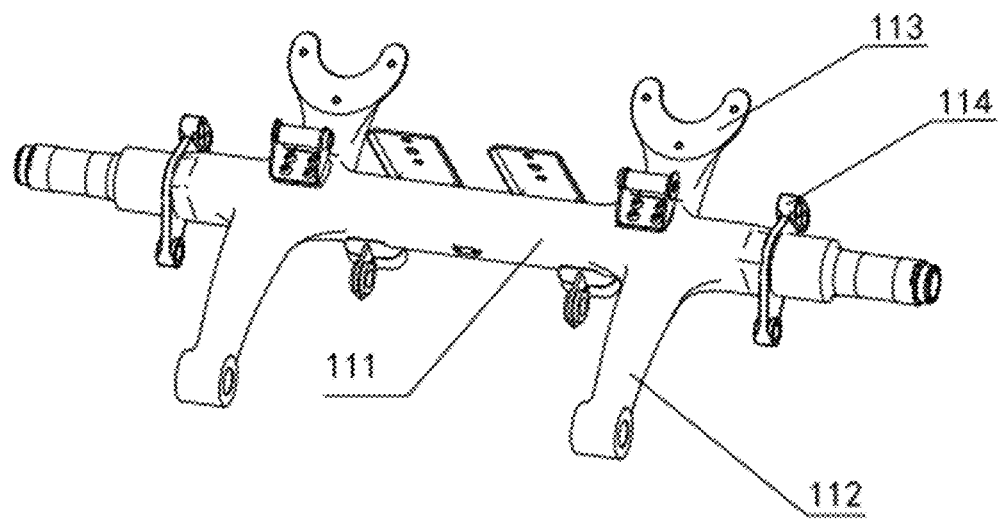
FIG. 9 shows a schematic structural diagram of the integrated axle assembly of the present application.
Figure 10:
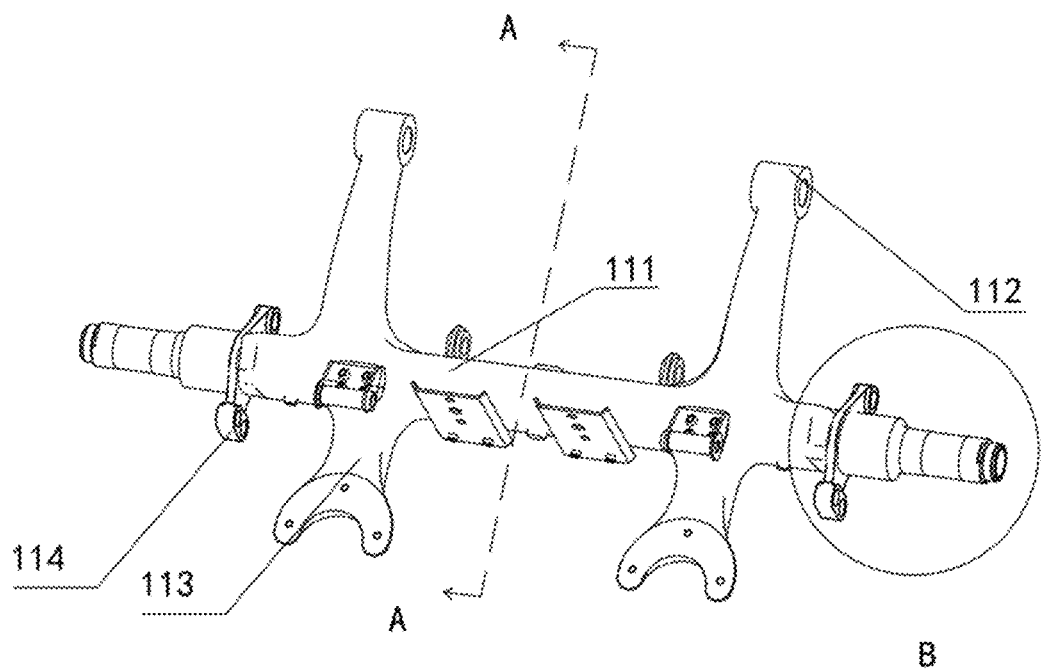
FIG. 10 shows a schematic structural diagram of another angle of the integrated axle assembly of the present application.

In the present invention, the axle tube assembly 4 is cast with the front support arm 5 as a whole, and the rear support arm 6 is pin-positioned and bolted, or cast with the front support arm 5 and the rear support arm 6, removing the existing technology, such as anti-breakage plate assembly 21, U-type bolts 22, guide arm pressure plate 23, guide arm 24, axle lower bracket 25, axle upper bracket 26, and other parts, reducing the difficulty of the assembly operation, reducing the risk of loosening the bolt connection, reduced failure factor, resulting in higher product quality and lower product costs. The integral casting process used in the present invention can effectively reduce the weight of the product while ensuring the quality of the product, so that the end customer can carry more goods and increase the revenue Referring to FIGS. 9 and 10, two different viewing angles of an integrated axle assembly 100 are revealed, respectively.

The integrated axle assembly 100 comprises an axle tube assembly 111 extending in a first direction, a front support arm 112 extending circumferentially from the axle tube assembly 111 in a second direction perpendicular to the first direction for connecting to a frame 130, a rear support arm 113 extending circumferentially from the axle tube assembly 111 in a third direction departing from the second direction for mounting an elastic component and a brake base plate 114, said axle tube assembly 111, front support arm 112, rear support arm 113 and brake base plate 114 being integrally cast and molded. It is readily understood that the integrated axle assembly 100 breaks the boundary between the traveling system and the brake system structure in the prior art, breaks the boundary between the axle structure and the suspension structure within the traveling system in the prior art, and integrally casts as many as possible of the spare parts as possible, so that on the one hand the assembly workload can be reduced, and on the other hand the integrally casted structure has a good consistency of the internal mechanical properties, and is not easy to be damaged in the course of use.

Figure 11:
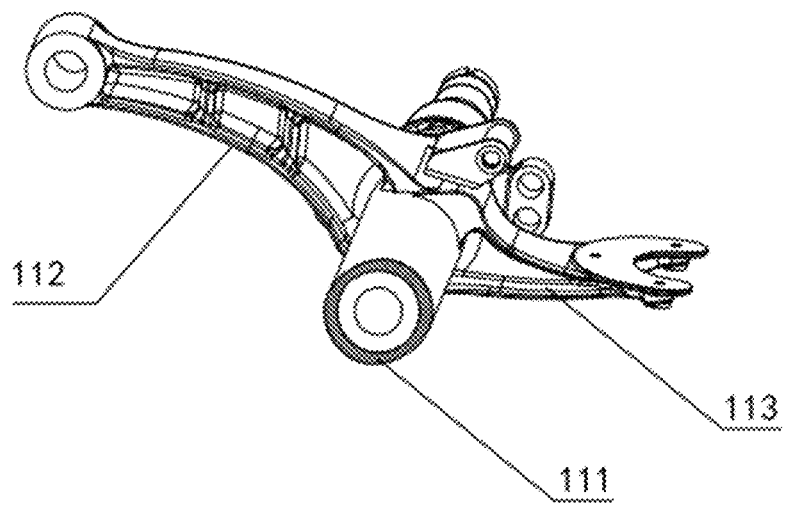
FIG. 11 shows a structural sectional view of one structure in FIG. 10 when viewed along the A-A section.

It is easily understood that the axle tube assembly 111 is the main structure of the axial direction of the integrated axle assembly 100, and in order to ensure the smallest size and the best mechanical properties in the case of the same material, in a preferred embodiment provided by the present application, the said axle tube assembly 111 is a longitudinal cylindrical shape, and FIG. 11 reveals such a case. At the same time, in order to prevent the effect of shrinkage during the casting process as well as to reduce the consumption of casting material, the front support arm 112 adopts a hollow cylinder structure. In addition, in order to make the front support arm 112 maintain the mechanical strength and stiffness in accordance with the requirements, the front support arm 112 is provided with reinforcing bars inside the front support arm 112 at appropriate positions.

Figure 12:
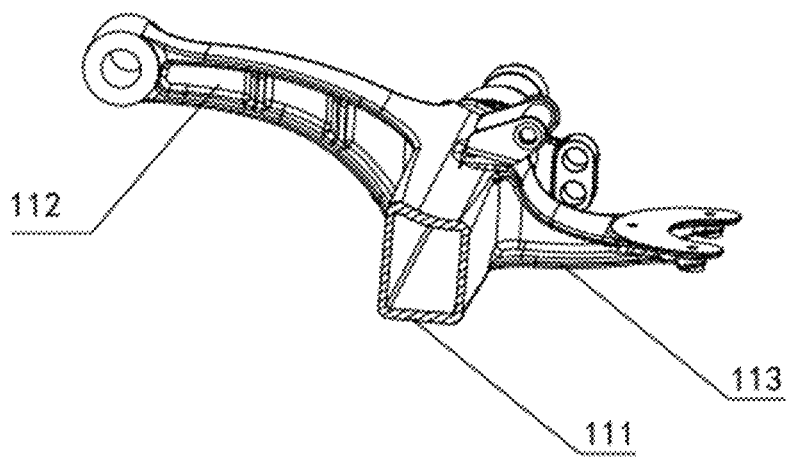
FIG. 12 shows a second structural sectional view of FIG. 10 when viewed along the A-A section.

It is readily understood that the axle tube assembly 111 is the main structure of the axial direction of the integrated axle assembly 100, and in order to facilitate the positioning and installation of other components, in a preferred embodiment provided by the present application, said axle tube assembly 111 is a longitudinal square cylinder, and FIG. 12 reveals such a case. The square cylindrical shaft tube assembly 111 has a flat outer surface, which can facilitate the positioning and installation of other components. At the same time, in order to prevent the effect of shrinkage during the casting process and to reduce the consumption of casting material, the front support arm 112 adopts a hollow cylinder structure. In addition, in order to make the front support arm 112 maintain mechanical strength and stiffness in accordance with the requirements, the front support arm 112 is internally provided with reinforcement bars at appropriate positions.

Figure 13:
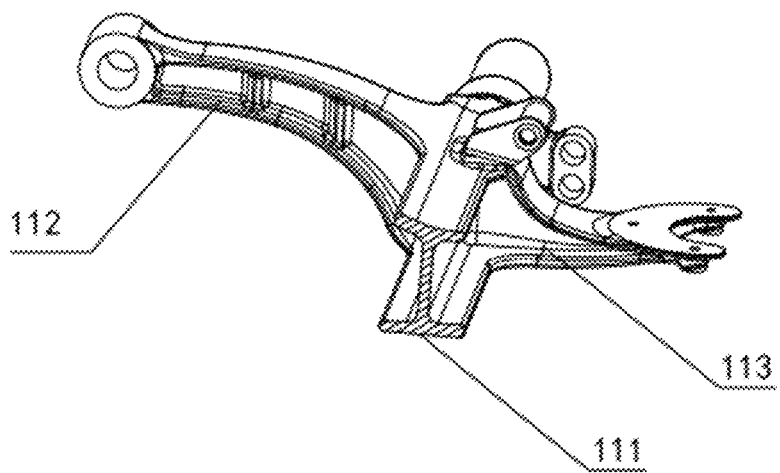
FIG. 13 shows a third structural sectional view of FIG. 10 when viewed along the A-A section in FIG. 10.

It is readily understood that the axle tube assembly 111 is the main structure of the axial direction of the integrated axle assembly 100, and in order to further reduce the consumption of casting material, in a preferred embodiment provided in the present application, said axle tube assembly 111 is a longitudinal I-bar body, which is revealed in FIG. 13. Compared to the longitudinally long square barrel shaft tube assembly 111 the consumption of material for substantially one wall can be reduced. At the same time, in order to prevent the effect of shrinkage during casting as well as to reduce the consumption of casting material, the front support arm 112 is constructed as a hollow cylinder. In addition, in order to enable the front support arm 112 to maintain mechanical strength and stiffness in accordance with the requirements, the front support arm 112 is provided with reinforcement bars inside the front support arm 112 at appropriate positions.

Figure 14:
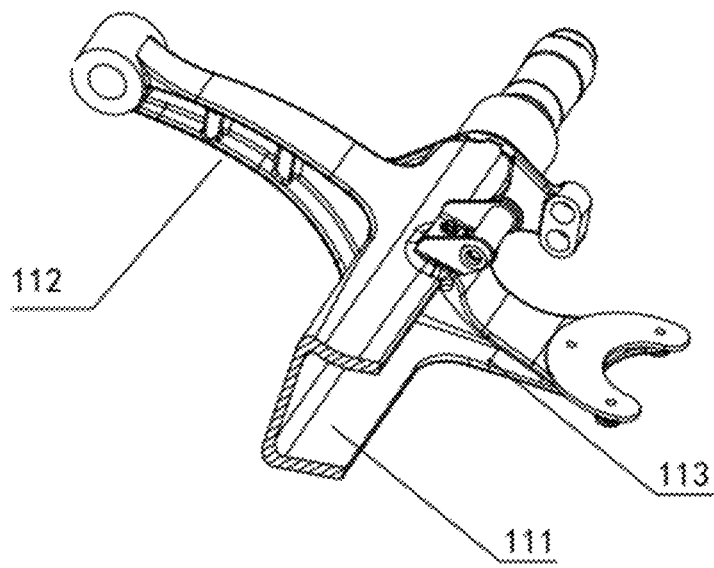
FIG. 14 shows a fourth structural sectional view of FIG. 10 when viewed along the A-A section in FIG. 10.
Figure 15:
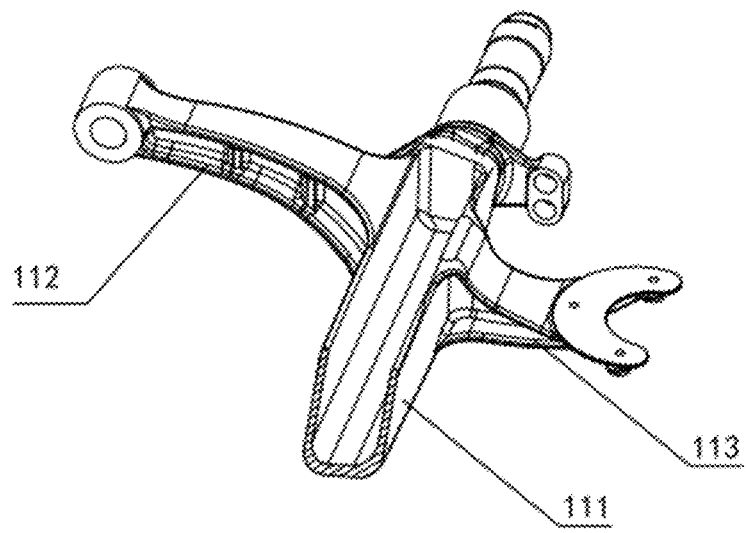
FIG. 15 shows a fifth structural sectional view of FIG. 10 when viewed along the A-A section.
Figure 16:
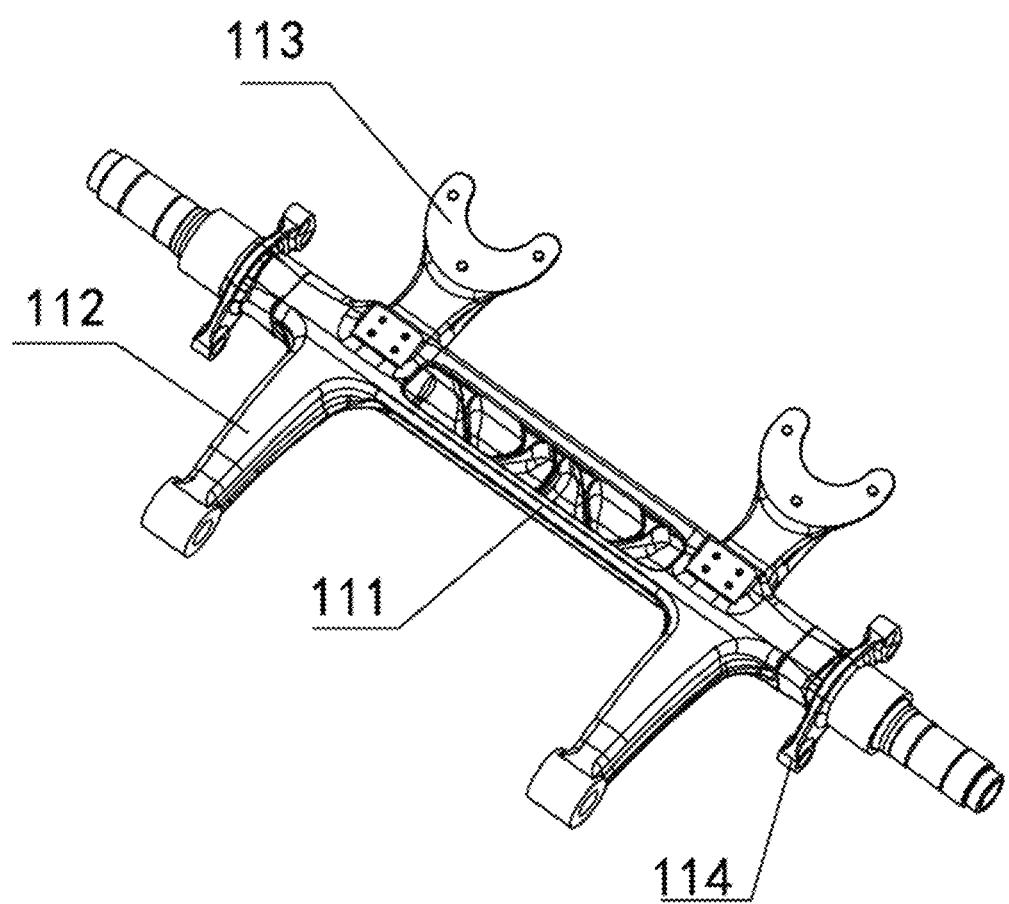
FIG. 16 shows a schematic view of yet another structure of the axle tube assembly.

It is readily understood that the axle tube assembly 111 is the main structure of the axial direction of the integrated axle assembly 100, and in order to facilitate installation, in a preferred embodiment provided in the present application, said axle tube assembly 111 is a longitudinal groove structure. In a preferred embodiment provided by the present application, the recess structure has a cross-section of a three-sided enclosing structure, which is revealed in FIGS. 14 and 15. In a preferred embodiment, the wall of the groove is provided with a flap edge structure on both sides. Wherein, the groove opening in FIG. 14 is oriented in a third direction. Wherein the orientation of the groove opening in FIG. 15 is a direction toward the frame 130. Meanwhile, in order to prevent the effect of shrinkage during the casting process as well as to reduce the consumption of casting material, the front support arm 112 adopts a hollow cylinder structure. In addition, in order to make the front support arm 112 maintain the mechanical strength and stiffness in accordance with the requirements, the front support arm 112 is provided with reinforcing ribs inside the front support arm 112 at appropriate positions. In a preferred embodiment provided in the present application, the groove is provided with network-like distributed reinforcement bars. The network-like distribution of reinforcement bars improves the load of the axle tube assembly 111 in all directions, refer to FIG. 16.

Figure 17:
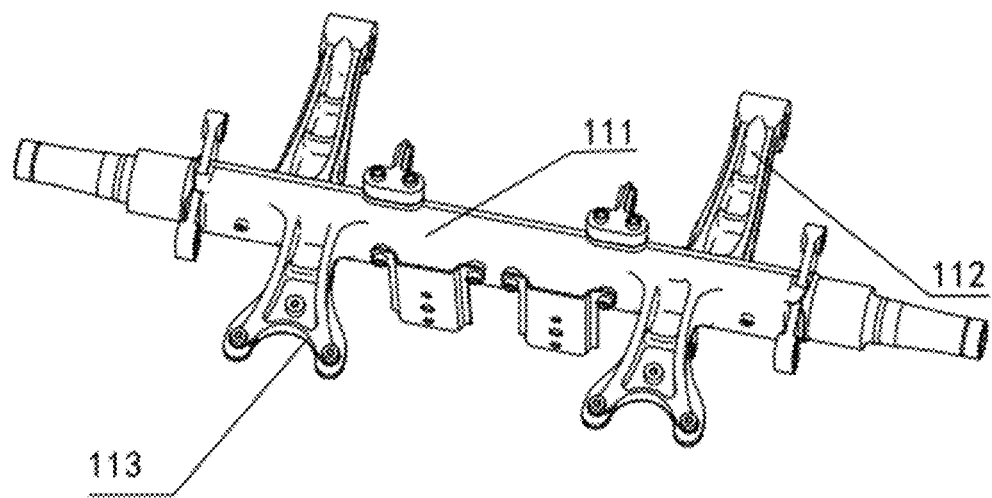
FIG. 17 shows a schematic view of one structure of a combination of a front support arm and a rear support arm.
Figure 18:
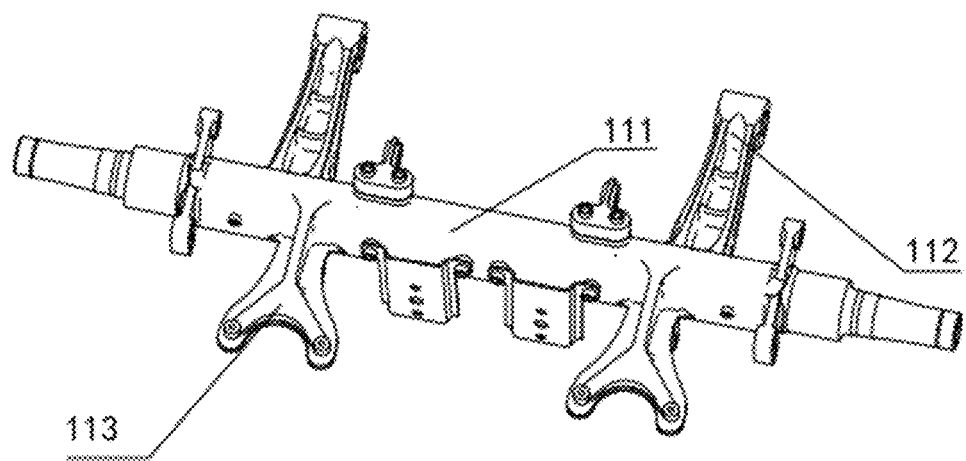
FIG. 18 shows a schematic view of yet another structure of a combination of a front support arm and a rear support arm.
Figure 19:
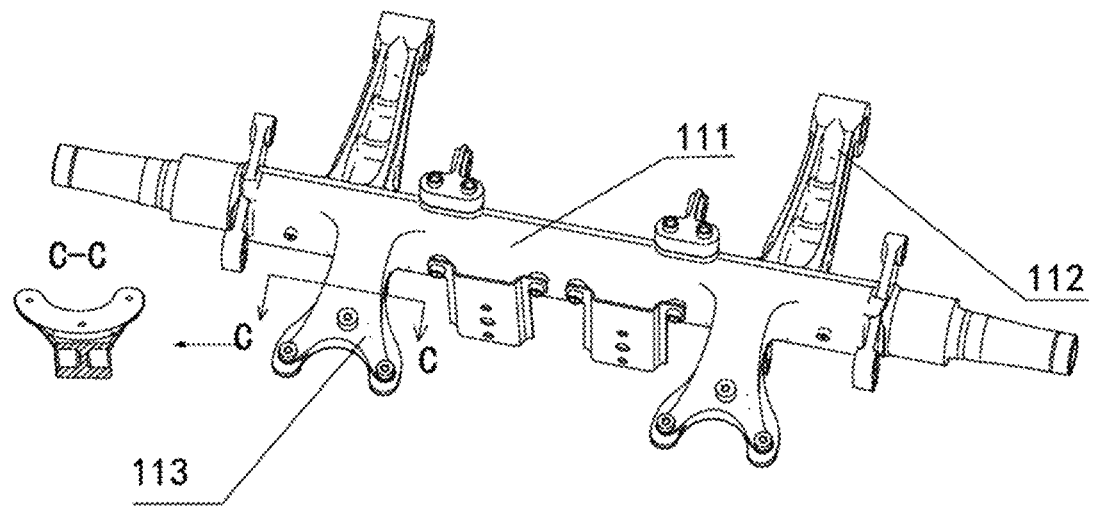
FIG. 19 shows a schematic diagram of the structure of yet another combination of a front support arm and a rear support arm.

Further, in a preferred embodiment provided in the present application, in order to reduce the casting difficulty of the front support arm 112, said front support arm 112 is provided as a groove structure, and the reinforcing bars are appropriately provided within the groove. The front support arm 112 of the recess structure is easier to cast relative to the front support arm 112 of the hollow cylinder structure. Wherein the recess has a first groove wall and a second groove wall extending in a second direction, and transverse reinforcement bars connecting the first groove wall and the second groove wall. FIGS. 17 through 19 reveal this type of front support arm 112 structure.

Figure 20:
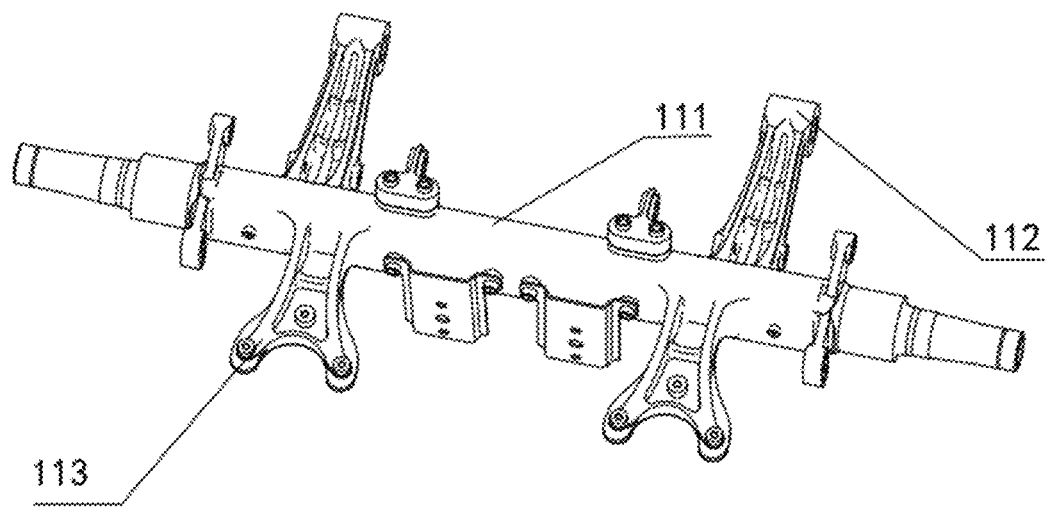
FIG. 20 is a schematic diagram of the structure of yet another combination of a front support arm and a rear support arm.
Figure 21:
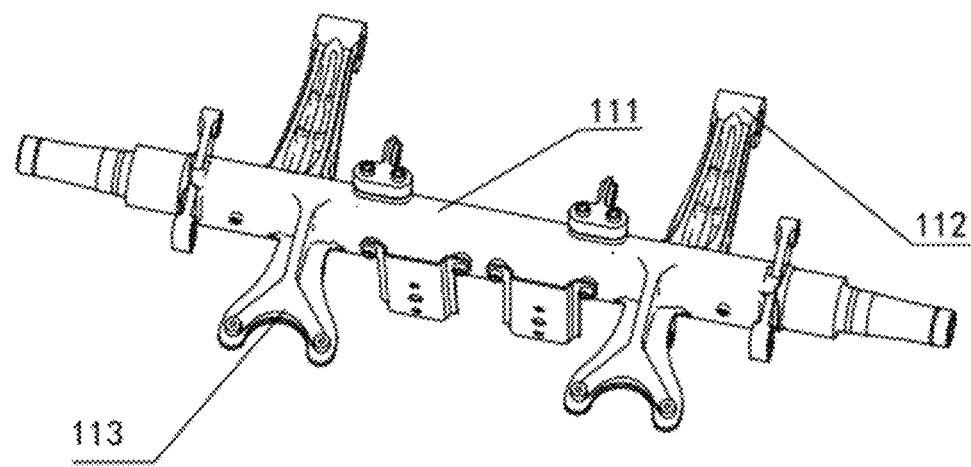
FIG. 21 is a schematic diagram of the structure of yet another combination of a front support arm and a rear support arm.
Figure 22:
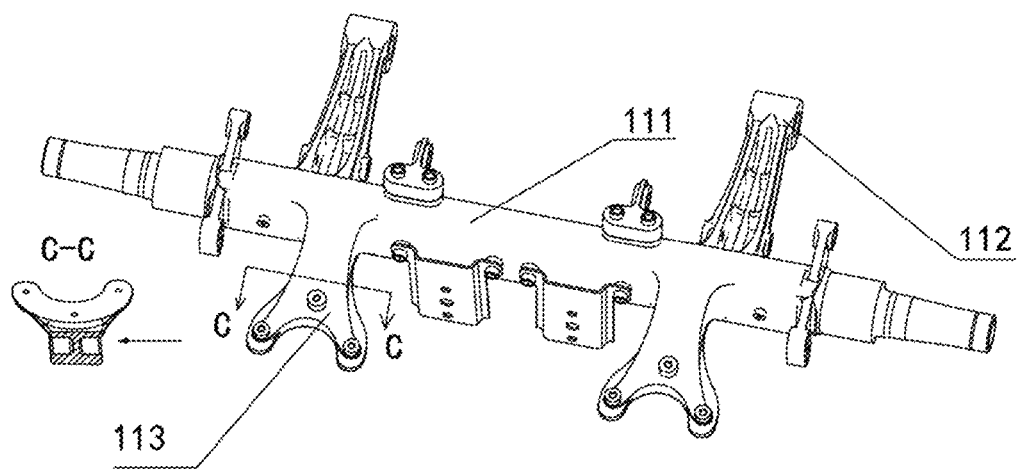
FIG. 22 shows a schematic diagram of the structure of yet another combination of a front support arm and a rear support arm.

Further, in a preferred embodiment provided in the present application, in order to reduce the casting difficulty of the front support arm 112, said front support arm 112 is provided as a groove structure, with reinforcing bars appropriately provided within the groove. The front support arm 112 of the recess structure is easier to cast relative to the front support arm 112 of the hollow cylinder structure. Wherein the groove has a first groove wall and a second groove wall extending in a second direction, transverse reinforcement bars connecting the first groove wall and the second groove wall, and longitudinal reinforcement bars extending in a direction substantially in line with the first groove wall. FIGS. 20 to 22 reveal the front support arm 112 structure of the species.

Figure 23:
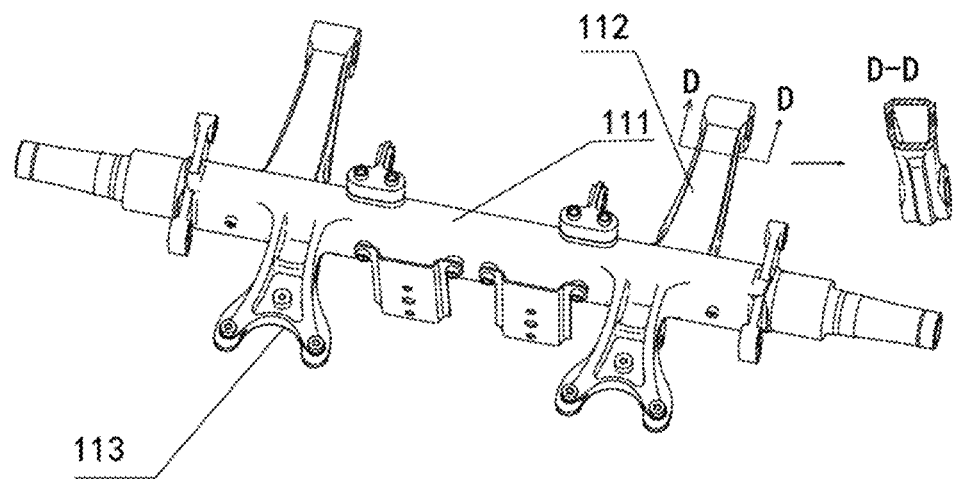
FIG. 23 shows a schematic diagram of the structure of yet another combination of a front support arm and a rear support arm.
Figure 24:
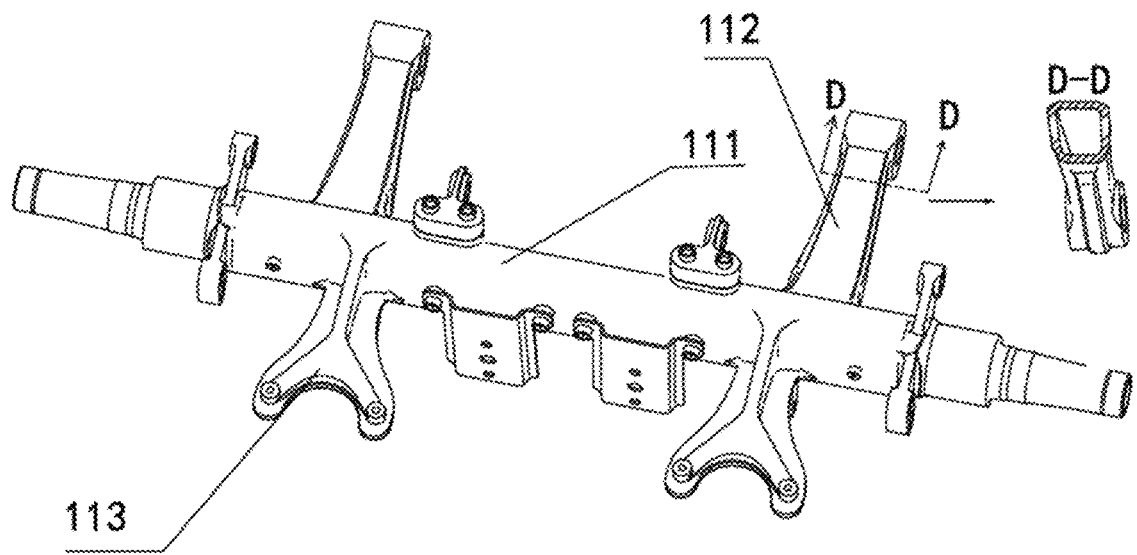
FIG. 24 shows a schematic diagram of the structure of yet another combination of a front support arm and a rear support arm.
Figure 25:
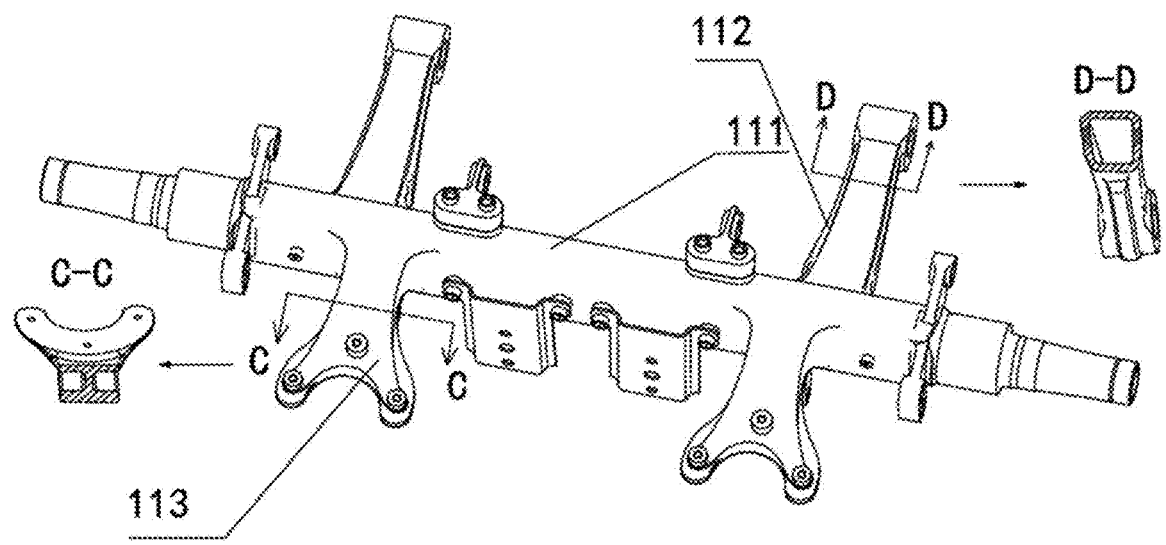
FIG. 25 is a schematic diagram of a structure of yet another combination of a front support arm and a rear support arm.

Further, in a preferred embodiment provided in the present application, in order to reduce the difficulty of casting the front support arm 112 as well as to reduce the consumption of casting materials, the front support arm 112 adopts a hollow cylinder structure and the internal reinforcement bars are removed. FIGS. 23 to 25 reveal such a front support arm 112 structure.

Figure 26:
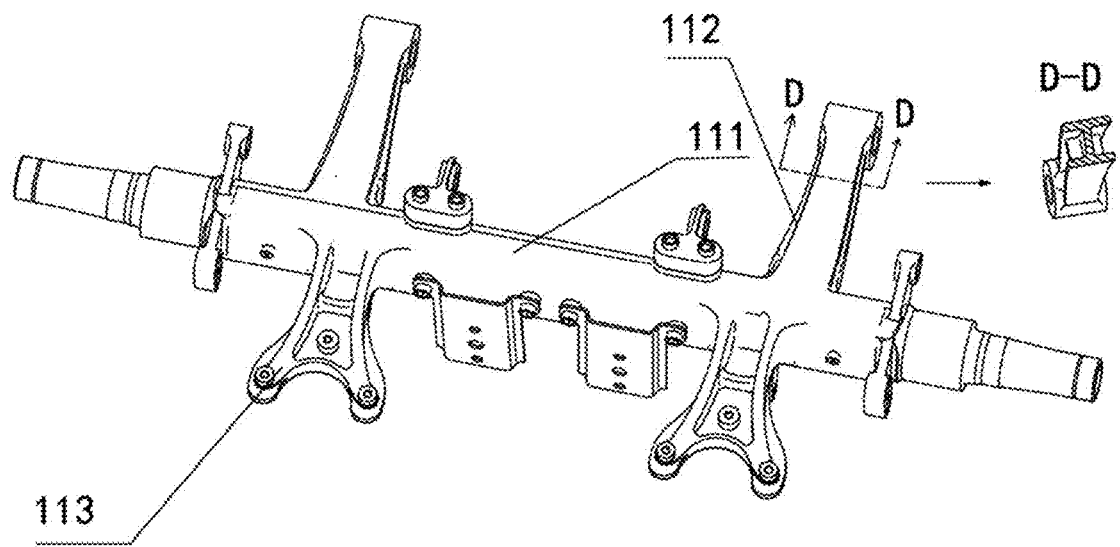
FIG. 26 shows a schematic diagram of a structure of yet another combination of a front support arm and a rear support arm.
Figure 27:
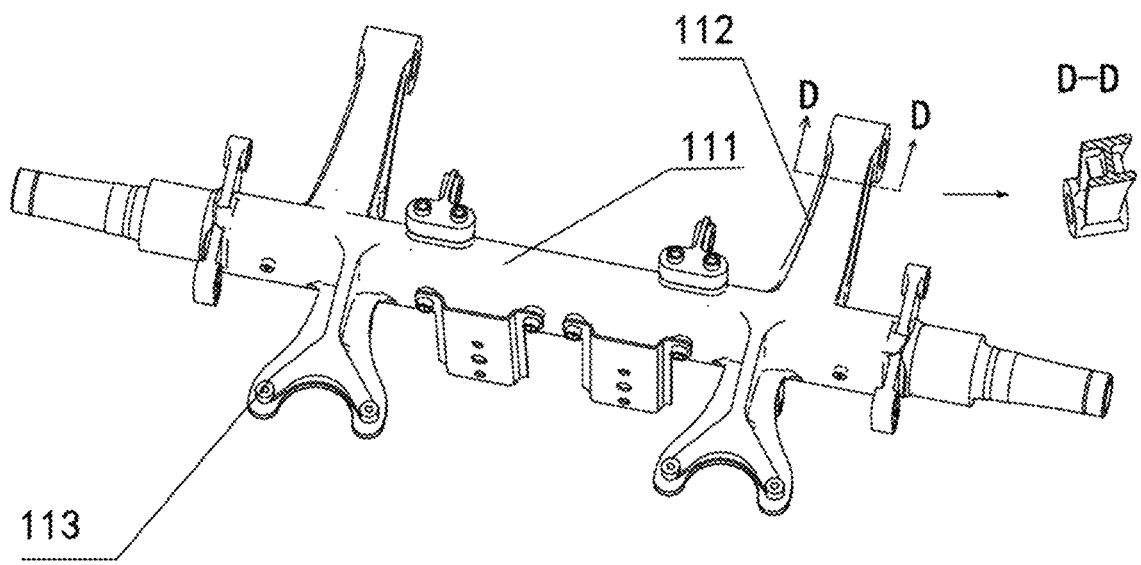
FIG. 27 is a schematic diagram of a structure of yet another combination of a front support arm and a rear support arm.
Figure 28:
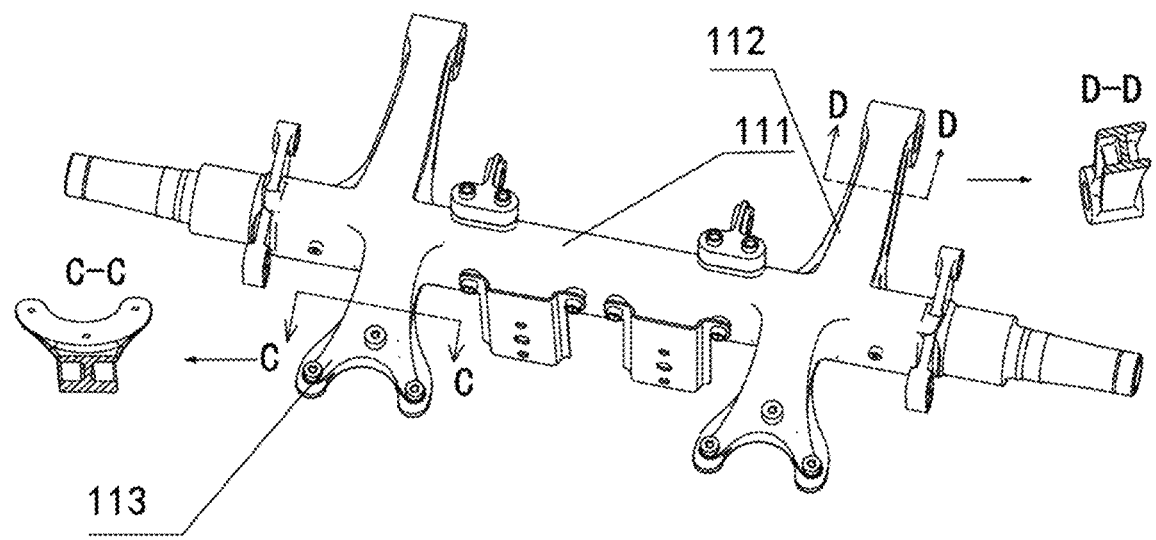
FIG. 28 is a schematic diagram of a structure of yet another combination of a front support arm and a rear support arm.

Further, in a preferred embodiment provided in the present application, in order to reduce the casting difficulty of the front support arm 112 as well as to reduce the consumption of casting materials, the front support arm 112 adopts an I-bar structure, i.e., the cross-section is an I-shaped structure. FIGS. 26 through 28 reveal such a front support arm 112 structure.

Figure 29:
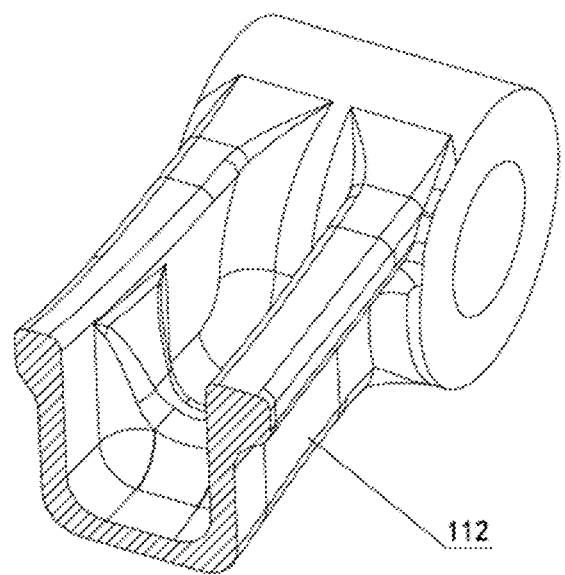
FIG. 29 shows a schematic structural diagram of yet another front support arm cross-section.

Further, in a preferred embodiment provided in the present application, in order to reduce the casting difficulty of the front support arm 112 as well as to reduce the consumption of casting materials, the front support arm 112 adopts a longitudinal groove, and the groove wall is provided with a folded edge structure on both sides, i.e., the cross-section is roughly in a three-side encircling structure, and the edge portion is reinforced. FIG. 29 reveals such a structure. The three-sided enclosure may be specifically made of smooth curved surfaces, or it may be made of straight-sided connections, with the connection portions being treated with smooth transitions. These adaptive changes to specific application scenarios should clearly not be construed as being outside the scope of substantive protection of this application.

Further, in a preferred embodiment provided in the present application, in order to improve the supporting effect of the rear support arm 113 on the air spring assembly, said rear support arm 113 is a horn structure that gradually contracts along the third direction space. FIGS. 11 through 15 reveal such a rear support arm 113 structure.

Further, in a preferred embodiment provided in the present application, in order to reduce the casting difficulty of the rear support arm 113 as well as to reduce the consumption of casting material, said rear support arm 113 is provided as a recess structure, with reinforcing ribs appropriately provided within the recess. The rear support arm 113 of the groove structure is easier to cast relative to the front support arm 112 of the horn structure. Wherein the recess has a third groove wall and a fourth groove wall extending in a third direction, transverse reinforcement bars connecting the third groove wall and the fourth groove wall. FIG. 17, FIG. 20 and FIG. 23 reveal the rear support arm 113 structure of the species.

Further, in a preferred embodiment provided in the present application, in order to reduce the casting difficulty of the rear support arm 113, to reduce the consumption of casting material, and to improve the structural strength of the rear support arm 113, said rear support arm 113 is provided as a prismatic raised structure. The prismatic projection of this rear support arm 113 extends from a third direction and splits in two at an appropriate position to form, a fork-shaped prismatic projection. FIG. 18, FIG. 21 and FIG. 24 reveal this rear support arm 113 structure.

Further, in a preferred embodiment provided by the present application, in order to improve the structural strength of the rear support arm 113, said rear support arm 113 is provided with reinforcing bars distributed in along the third direction. FIG. 19, FIG. 22 and FIG. 25 reveal such rear support arm 113 structure.

Figure 30:
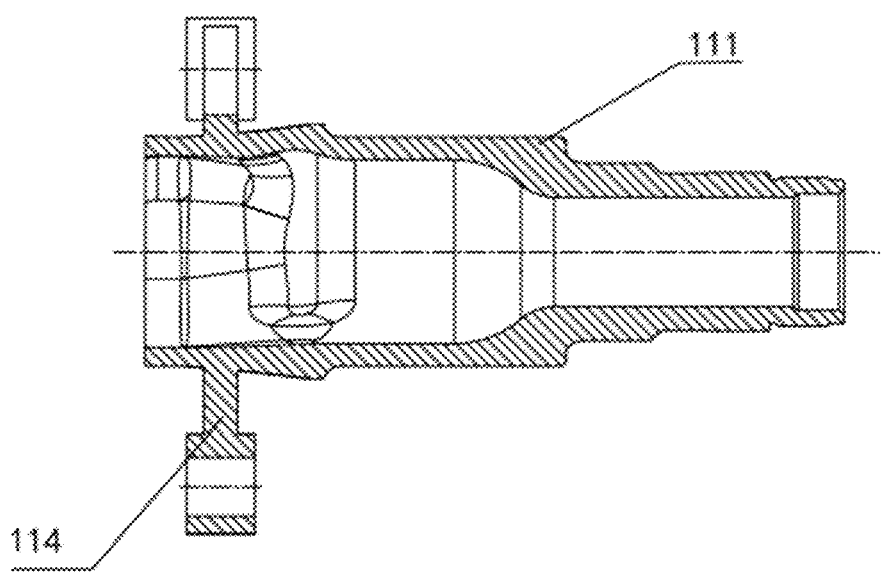
FIG. 30 is a schematic diagram of the structure of one kind of FIG. 10 when viewed in section B in FIG. 10.

Further, in a preferred embodiment provided by the present application, the axle tube assembly 111 is cast in one piece, refer to FIG. 30, which reveals a sectional structure of the end of the axle tube assembly 111.

Figure 31:
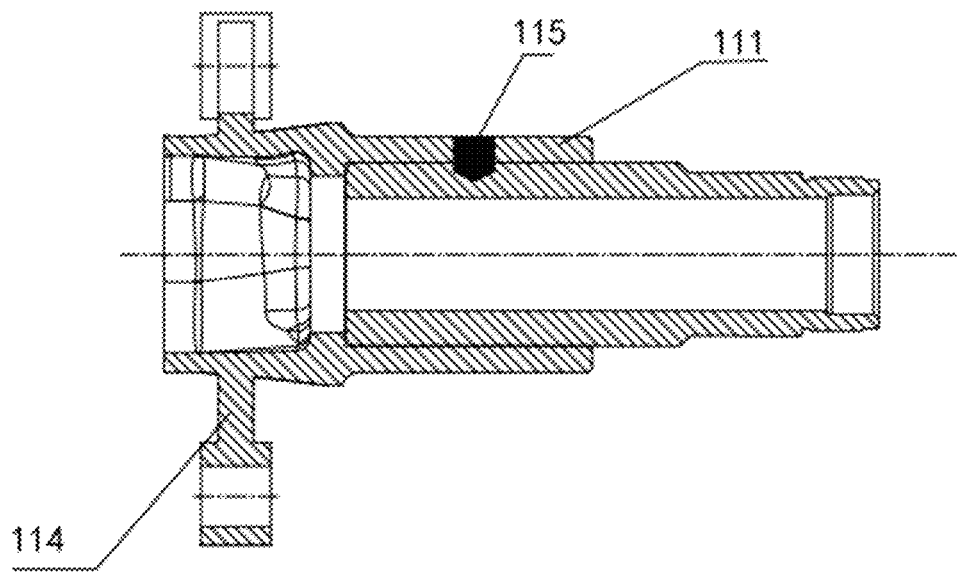
FIG. 31 shows a schematic diagram of the structure of another kind of FIG. 10 when viewed in part B section.

Further, in a preferred embodiment provided by the present application, the axle tube assembly 111 may comprise two sections nested together in a sleeve, refer to FIG. 31, revealing a sectional structure of the two-section axle tube assembly 111, the two-end axle tube assembly 111 being axially secured by a locking pin 115.

Figure 32:
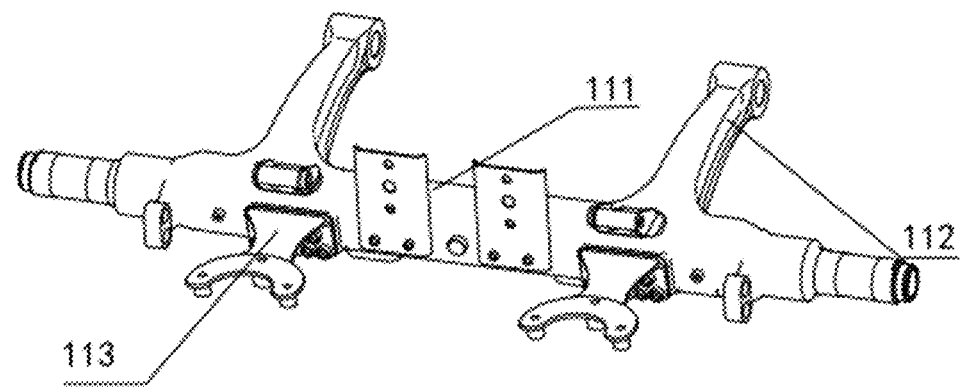
FIG. 32 shows a schematic diagram of the structure when the rear support arm is independent.

Referring to FIG. 32, the rear support arm 113 may be relatively independently It is mated to the axle tube assembly 111 by threads and has at least two mounting positions. It is readily appreciated that the rear support arm 113 is used to mount and support the air spring assembly. By adjusting the relative position of the rear support arm 113 with respect to the axle tube assembly 111, in particular the height up and down with respect to the center of the axle tube assembly 111, the suspension performance of the vehicle can be tuned, resulting in better vehicle stability.

Figure 33:
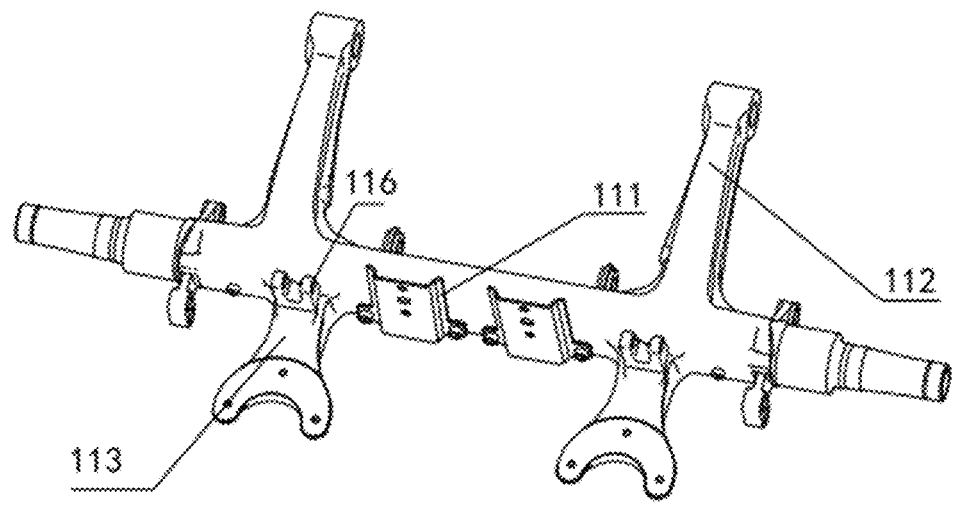
FIG. 33 shows a schematic diagram of a structure when the rear support arm is integrated with the damper mount.

Referring to FIG. 33, the rear support arm 113 can be integrated with the mount 116 of the damper 120, thereby further improving the integration of the integrated axle assembly 100.

Figure 34:
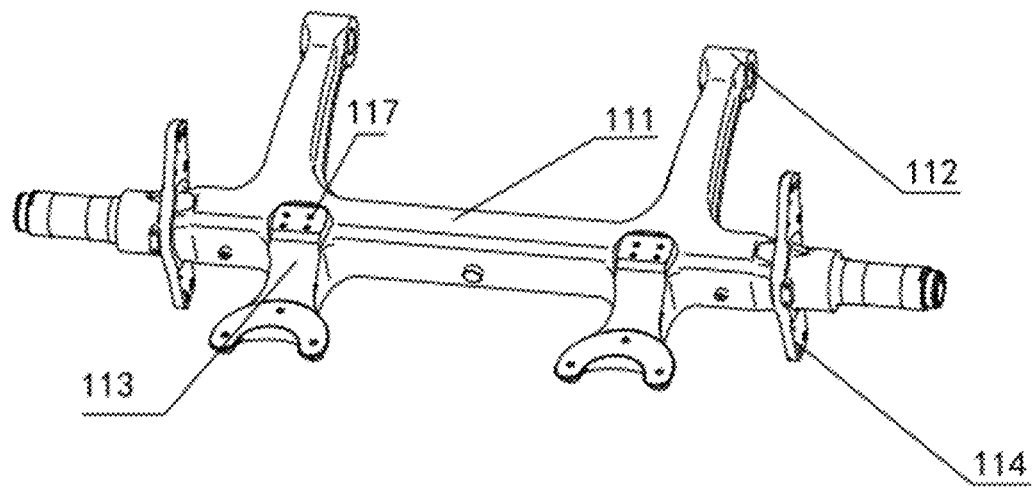
FIG. 34 shows a schematic structural diagram when the rear support arm is integral with the damper mounting hole and the brake base plate is used to mount a caliper bracket for a disc brake.

Referring to FIG. 34, the rear support arm 113 may be provided with only the mounting holes 117 of the damper 120, thereby further improving the integration of the integrated axle assembly 100 while simplifying the structure.

Figure 35:
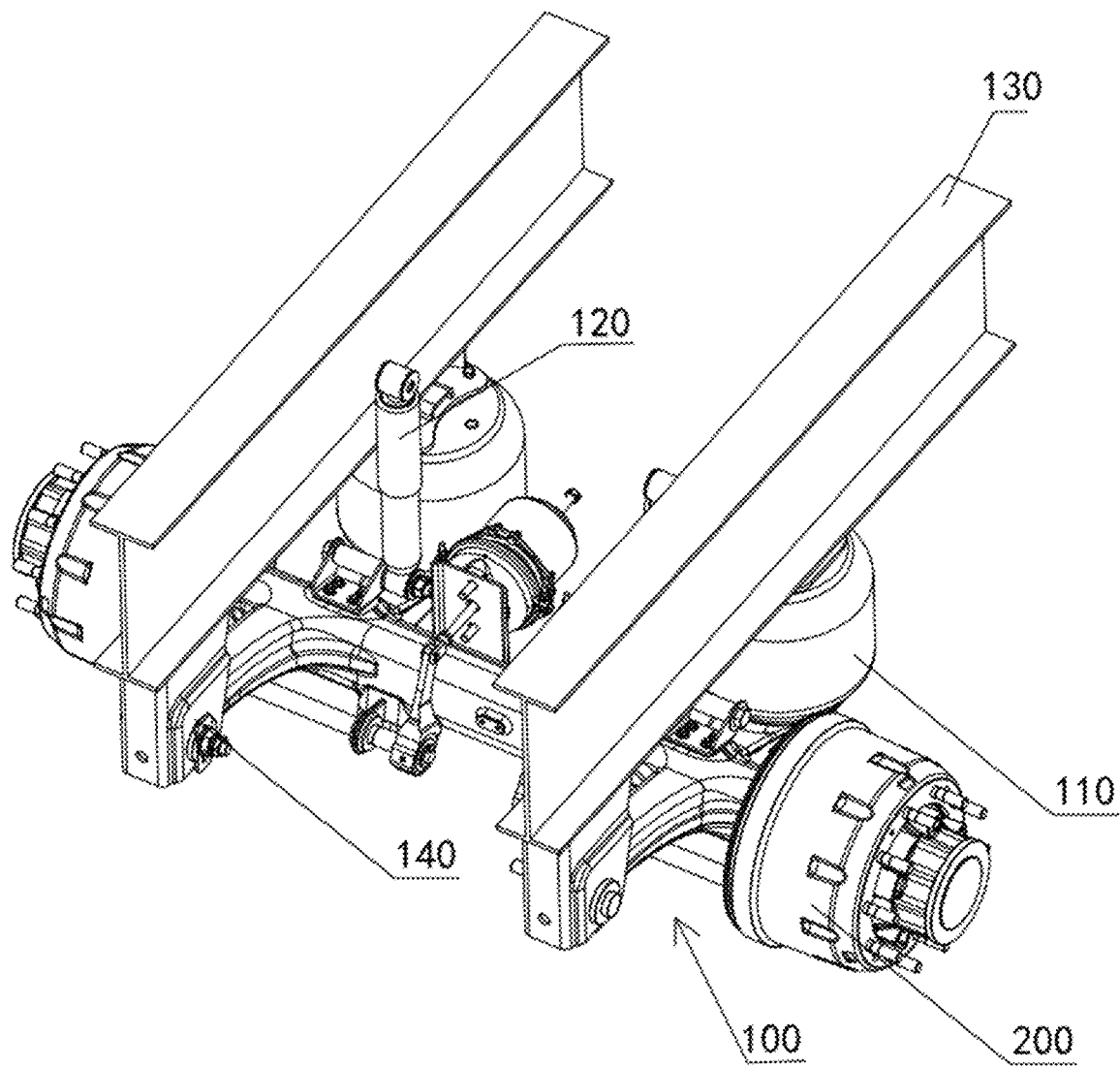
FIG. 35 shows a three-dimensional structural schematic diagram of the structural assembly of the present application for mounting a drum brake.
Figure 36:
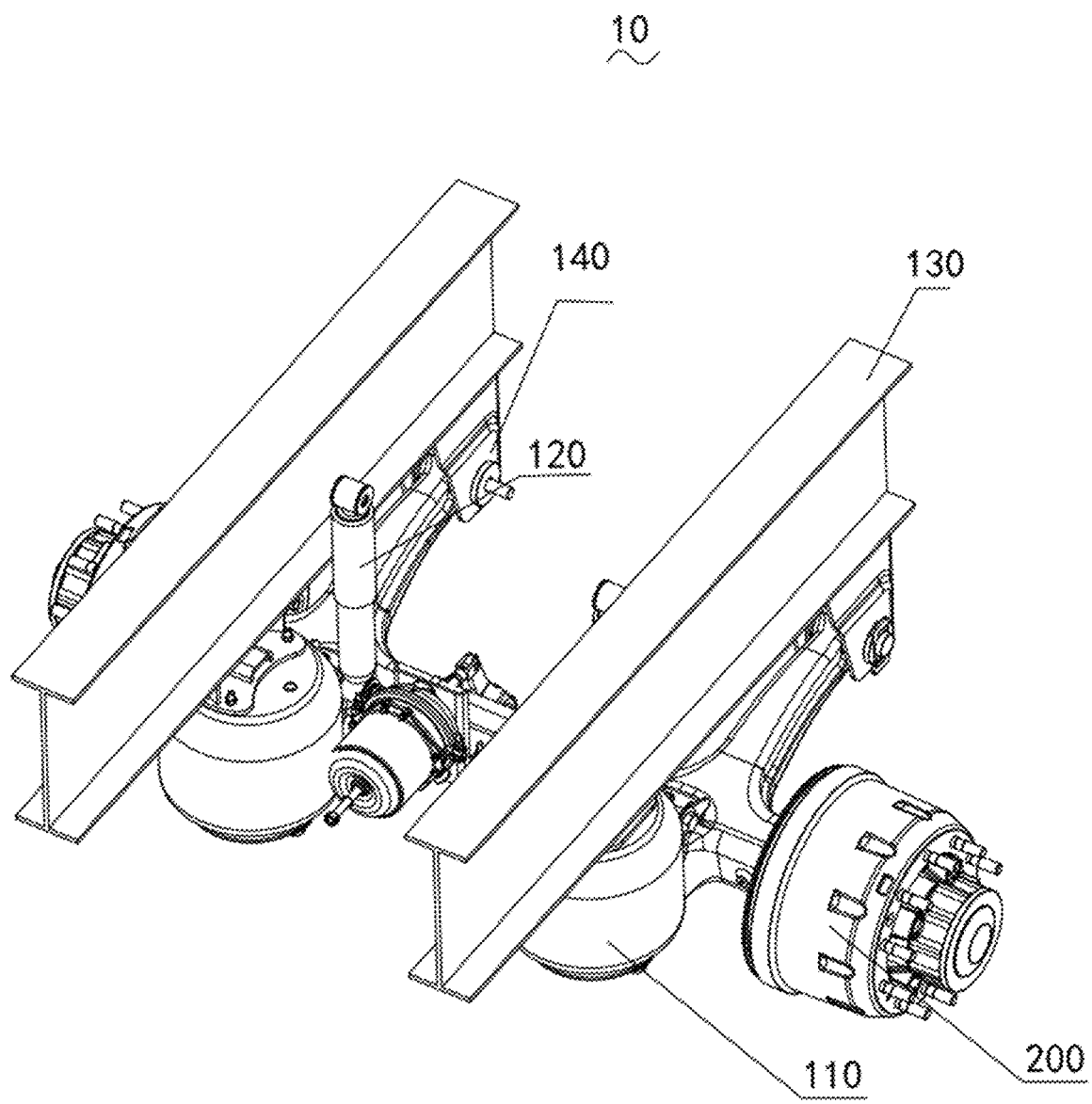
FIG. 36 shows a three-dimensional schematic diagram of the structure assembly of the present application for mounting a drum brake from another angle.
Figure 37:
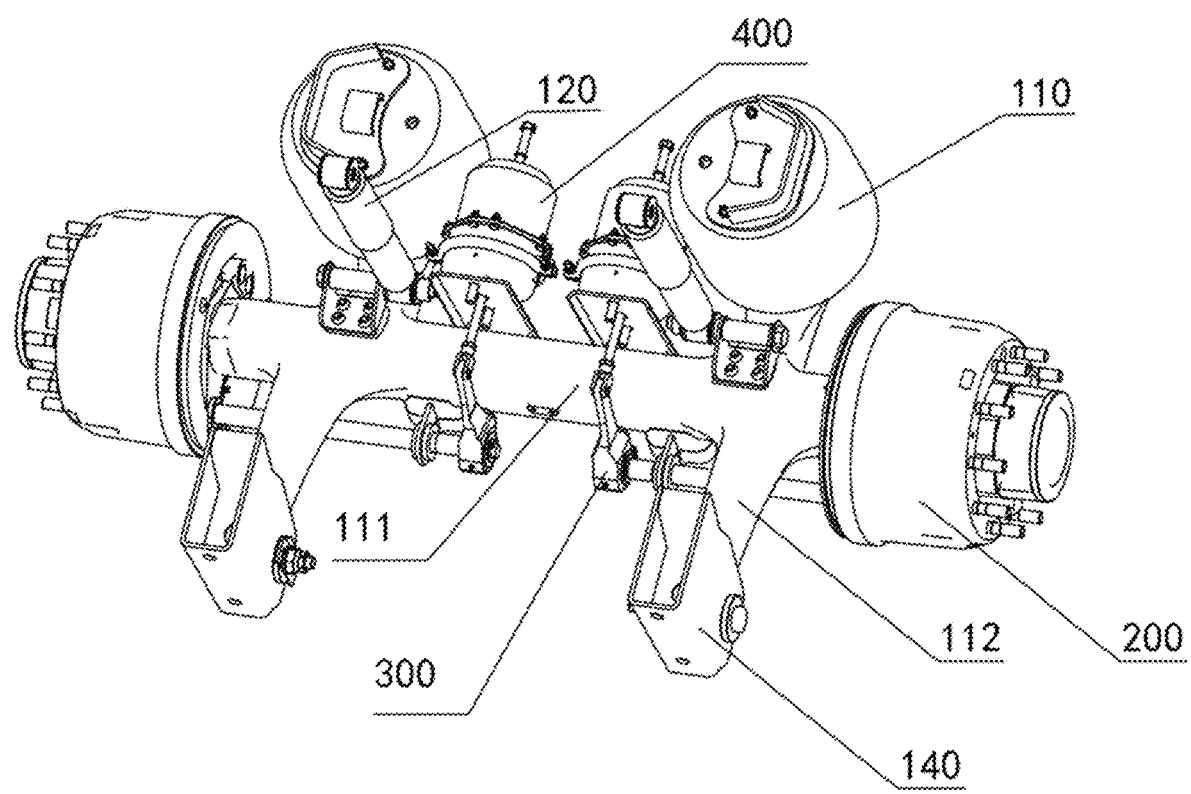
FIG. 37 shows a schematic structural diagram of the structure assembly of the present application with the drum brake mounted and the frame removed.
Figure 38:
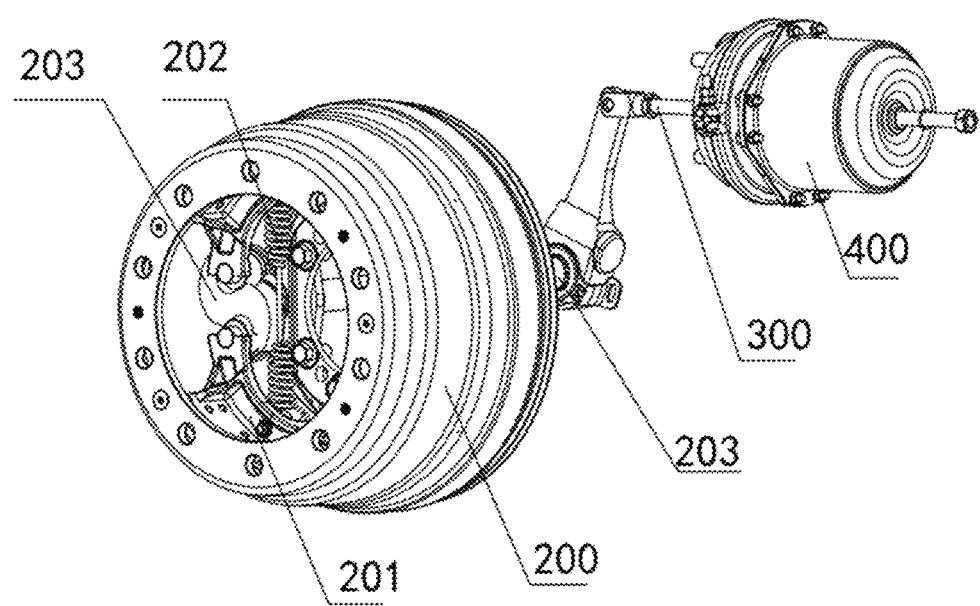
FIG. 38 shows a schematic diagram of the structure of the drum brake.
Figure 39:
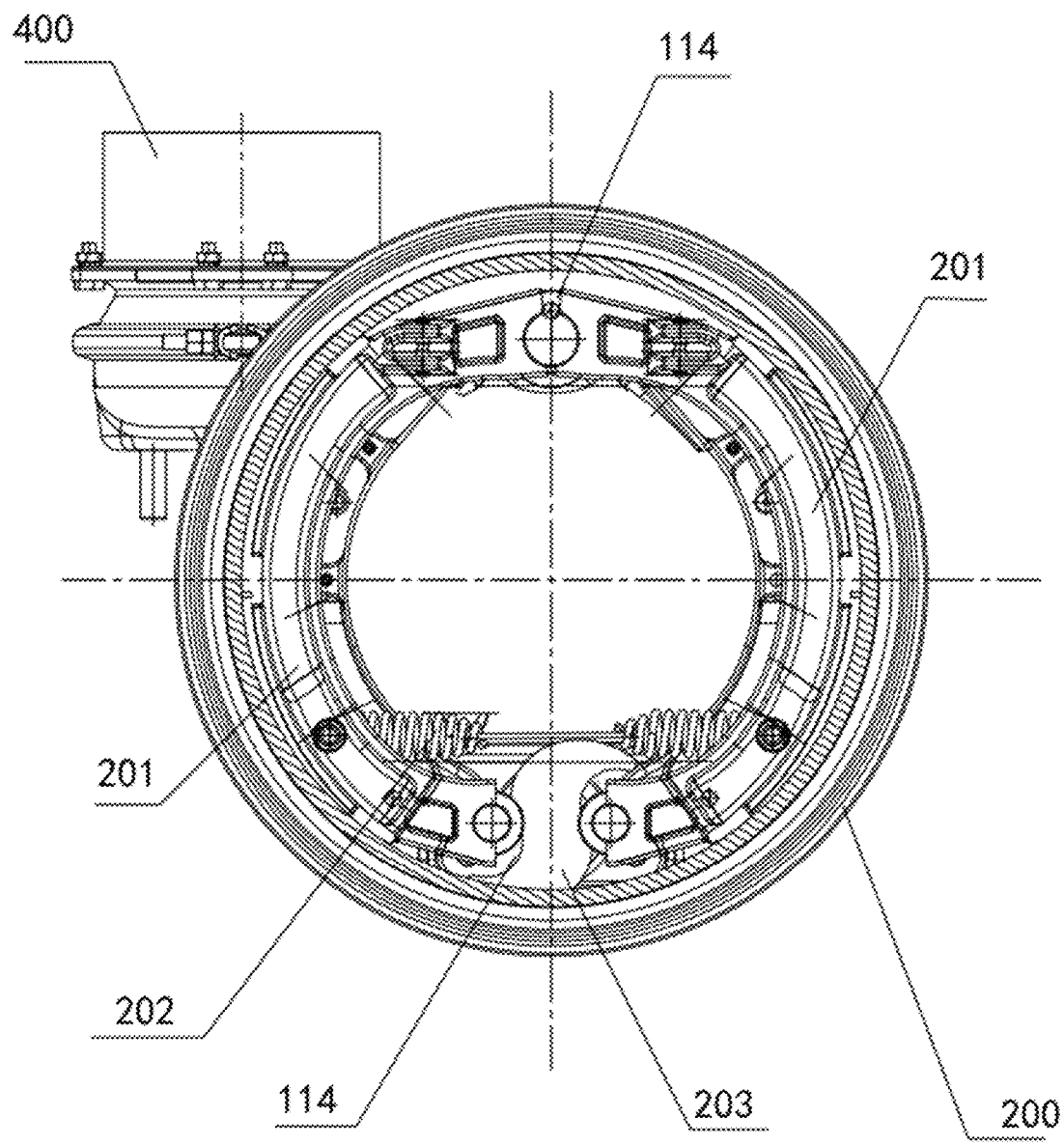
FIG. 39 shows a sectional view of one angle of the drum brake.
Figure 40:
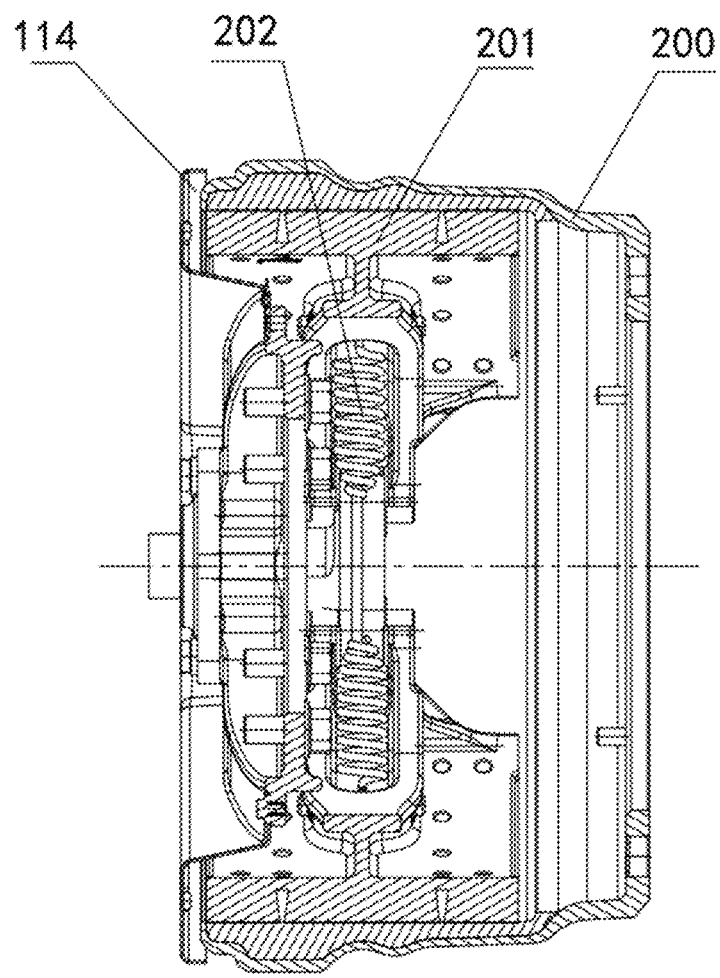
FIG. 40 shows a cross-sectional view of another angle of the drum brake

Referring to FIGS. 35 to 37, respectively, reveal situations when the integrated axle assembly 100 is mounted on the frame 130. Among other things, FIG. 35 shows a schematic diagram of the structural assembly at an angle when the integrated axle assembly 100 is mounted on the frame 130. FIG. 36 shows a schematic diagram of the structural assembly of the integrated axle assembly 100 at another angle when the integrated axle assembly 100 is mounted to the frame 130. FIG. 37 shows a schematic view of the structure of the integrated axle assembly 100 when the frame 130 is removed with the air bag assembly 110 suspended. The present application also provides a structural assembly 10 having an integrated axle assembly 100, further comprising:

a damper 120 mated to the frame 130 at one end and mated to the integrated axle assembly 100 at the other end;

an air spring assembly 110 carried on a rear support arm 113 and mappable to the frame 130.

The integrated axle assembly 100 can reduce the complexity of assembly and improve assembly efficiency. In specific use, the integrated axle assembly 100, the air gas spring assembly 110, and the damper 120 can be connected to the frame 130. And the front support arm 112 is hingedly coupled to the frame 130 via lugs 140.

Further, in a preferred embodiment provided in the present application, to further improve integration, said structure assembly 10 further comprises:
- a brake mated to a brake base plate;
- a linkage system 300 mounted to the axle tube assembly 111, mating with the brake and selectively switching the brake between a braked state and a free state;
- an air chamber 400 mated to the linkage system 300 and providing braking force.

By changing the air pressure in the air chamber 400, switching of the brake between the braking state and the free state can be realized to meet the needs of vehicle driving.

Referring to FIGS. 37 to 40, further, in a preferred embodiment provided by the present application, said brake comprises:
- a brake drum 200 coupled to a brake base plate 114;
- a brake shoe 201 embedded in the brake drum 200 and oscillating relative to an inner wall of the brake drum 200;
- a reset spring 202 providing a reset force for the brake shoe 201;
- a camshaft 203 mounted to the brake base plate 114 that drives the brake shoe 201 to oscillate.

The brake drum 200 is assembled to the integrated axle assembly 100 via the brake base plate 114. The brake shoe 201 is embeddedly mounted within the brake drum 200 and is swingable relative to an inner wall of the brake drum 200. A reset spring 202 is connected to the brake shoe 201 at one end, and when the operator issues a braking action, the air chamber 400 applies a braking force through the linkage system 300, and the linkage system 300 drives the camshaft 203 to rotate, which in turn drives the brake shoe 201 to oscillate close to, and ultimately contact and rub against, the inner wall of the brake drum 200 for braking. After the braking force is removed, the brake shoe 201 moves away from the inner wall of the brake drum 200 under the action of the reset spring 202.

Figure 41:
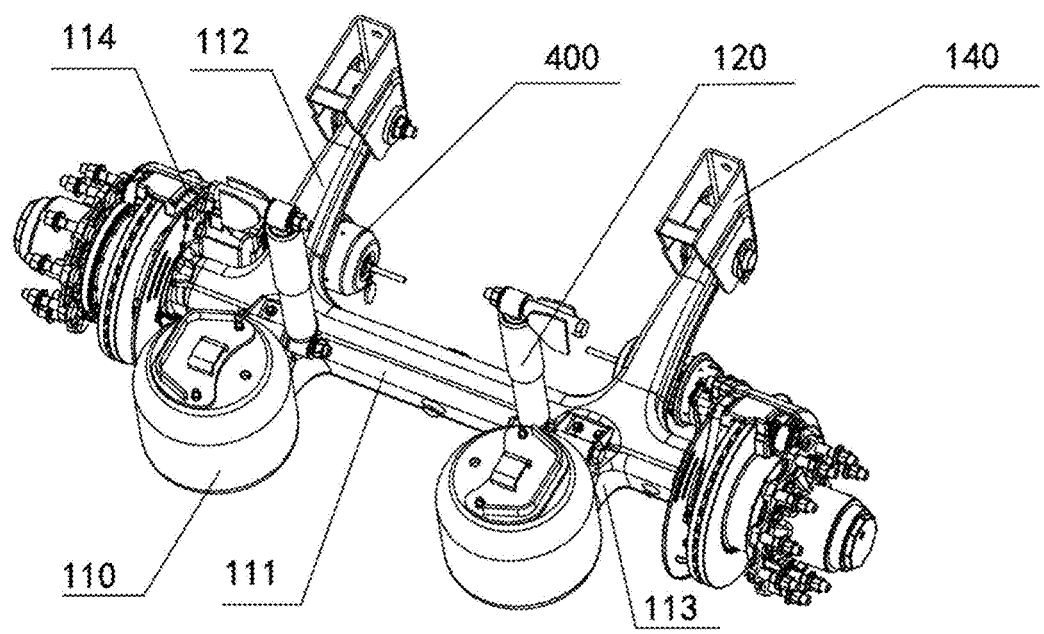
FIG. 41 shows a schematic view of the structure of the structural assembly of the present application for mounting a disk brake.
Figure 42:
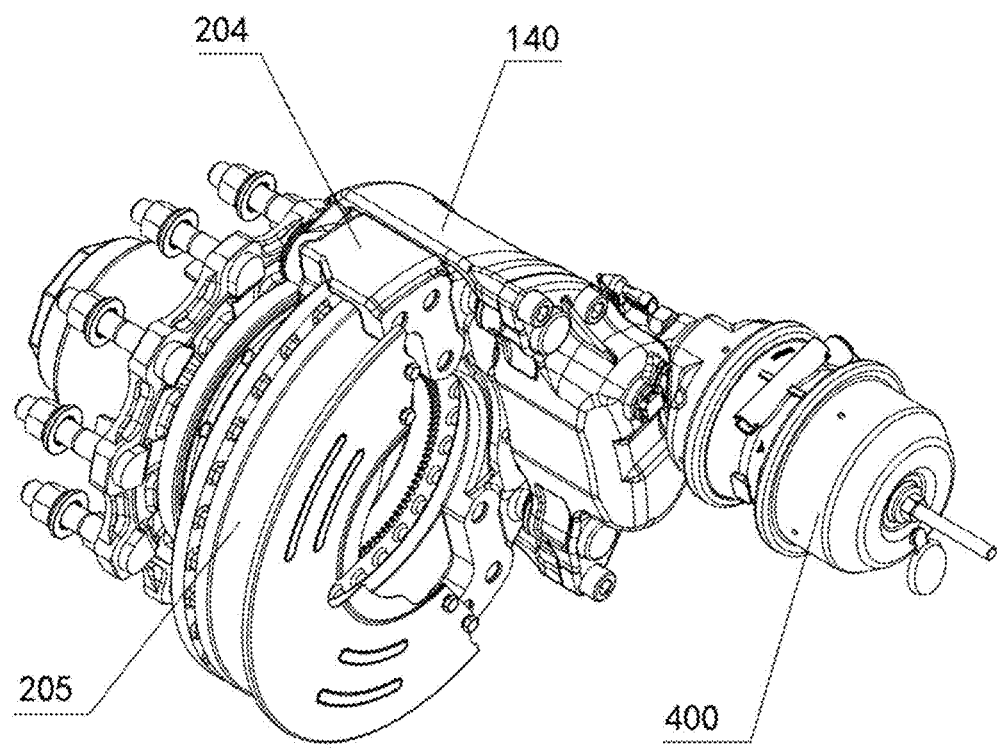
FIG. 42 shows a schematic view of the structure of the disk brake.

Referring to FIGS. 41 and 42, further, in a preferred embodiment provided in the present application, said brake comprises:
- a caliper bracket 204 coupled to a brake base plate 114;
- a brake disk 205 partially seated into the caliper bracket 204;
- a caliper 206 mounted to the caliper bracket 204, selectively proximate or remote from the brake disk 205.

The caliper bracket 204 is assembled to the integrated axle assembly 100 via the brake base plate 114. The brake disc 205 is partially seated into the caliper bracket 204. the brake caliper 206 is mounted to the caliper bracket 204, selectively proximate or remote from the brake disc 205. When a braking action is initiated by an operator, the air chamber 400 applies a braking force through the linkage system 300, which moves the hydraulic system, which in turn drives the caliper 206 close to the brake disc 205 and causes the corresponding friction components to eventually contact the friction disc 205 to brake. After the braking force is removed, the brake caliper 206 moves away from the brake disk 205 under the action of the hydraulic system.

Further, in a preferred embodiment provided in this application, said brake base plate is used for mounting a brake shoe for a drum brake or a caliper bracket for mounting a disk brake.

As in FIGS. 35 through 37 brake base plate 114 is used to mount brake shoes for drum brakes. And the brake base plate 114 may be used to mount a caliper bracket for a disk brake, as in FIG. 41.

It is noted that the terms "including", "comprising", or any other variant thereof, are intended to cover non-exclusive inclusion such that a process, method, commodity, or apparatus comprising a set of elements includes not only those elements, but also other elements not expressly listed, or also other elements not expressly listed. or which are inherent to such process, method, commodity or equipment. Without further limitation, the fact that an element is defined by the phrase "including a . . . " does not preclude the existence of another element of the same kind in the process, method, commodity, or apparatus including the said element.

The foregoing is only an example of the present application and is not intended to limit the present application. The present application is subject to various changes and variations for those skilled in the art. Any modifications, equivalent substitutions, improvements, etc. made within the spirit and principles of this application shall be included in the scope of the claims of this application.

What is claimed is:

1. An integrated axle assembly comprising an axle tube assembly and a guide arm assembly, characterized in that said guide arm assembly comprises:
   a front support arm, said front support arm being cast integrally with the axle tube assembly;
   a rear support arm, said rear support arm being fixedly connected to a side of the axle tube assembly away from the front support arm;
   said rear support arm is pinned and bolted to the axle tube assembly, and said rear support arm comprises an upper support plate, a lower support plate, an upper fixed seat, a lower fixed seat and a gas spring transition plate mounting tab, said upper fixed seat and lower fixed seat are fixedly connected to the same end of the upper and lower support plates, said upper support plate is fixedly connected to the lower fixed seat and the gas spring transition plate mounting tab is connected to the upper support plate at an end away from the upper fixed seat, said upper support plate is fixedly connected to the lower fixed seat, and said gas spring transition plate mounting tab is connected to the upper support plate at an end away from the upper fixed seat, away from one end of the upper fixed seat, the bottom end of said gas spring transition plate mounting tab is fixedly connected to one end of the lower support plate away from the lower fixed seat, the thickness of said upper support plate and lower support plate cross-section is gradually thinning and narrowing from the root to the front end, and the thickness of said lower support plate is greater than the thickness of the upper support plate;
   wherein a middle reinforcing bar fixedly connected in the middle between said upper supporting plate and lower supporting plate, and there is a front reinforcing bar on the side of said middle reinforcing bar far away from the lower fixing seat, and the two ends of said front reinforcing bar are respectively fixedly connected with the opposite sides of the upper supporting plate and the lower supporting plate, and there is a bottom reinforcing bar on the side of said middle reinforcing bar far away from the front reinforcing bar, and the bottom reinforcing bar is fixedly connected to the outer walls of the lower supporting plate and the lower fixing seat on the bottom and the one side respectively, said bottom reinforcing bar is fixedly connected to the outer wall of the lower support plate and the lower fixing seat respectively, and said rear reinforcing bar is fixedly connected between said lower fixing seat and the upper support plate;

said rear reinforcement bar is connected to the root of the upper support plate at a forward position, and said rear reinforcement bar and the outer wall of the connection between the lower support plate and the lower fixed seat are provided with chamfered corners.

2. The integrated axle assembly according to claim 1, characterized in that said outer wall of said front support arm is provided with a first skeleton at a position of a connection section with the axle tube assembly, said front support arm is provided with a rounded first corner for transition at the connection section with the axle tube assembly, said upper wall of said front support arm is provided with a first cut corner at a position corresponding to the upper wall of the axle tube assembly, said lower wall of said front support arm is provided with a second cut corner at a position corresponding to the lower wall of the axle tube assembly.

3. The integrated axle assembly according to claim 1, characterized in that said front carrier arm comprises a shock absorber seat, a sand outlet, a reinforcing bar and a front carrier arm body, said sand outlet being provided in the middle of the front carrier arm body, said protrusions being provided in the inner and outer walls of the front carrier arm body and located at the port positions at both ends of the sand outlet, said shock absorber seat being provided in the front carrier arm body at a position close to the end of the axle tube assembly, said reinforcing bar being provided in the front carrier arm body at a position corresponding to the upper wall of the axle tube assembly and the lower wall of the axle tube assembly, reinforcement is provided on the outer wall of one end of the front support arm body away from the shaft tube assembly.

4. The integrated axle assembly according to claim 1, characterized in that said axle tube assembly is cast integrally from an axle tube body, a brake base plate, a half-axle sleeve and an ABS bracket seat, and said half-axle sleeve is set with different wall thicknesses according to the load and force conditions.

5. The integrated axle assembly according to claim 4, characterized in that said axle tube assembly is of eccentric circle design, said upper and lower walls of said axle tube body cross-section can be realized with different wall thicknesses of different sizes, and said axle tube assembly can be adjusted with wall thicknesses by changing the inner and outer diameters of its inner and outer circles and the centroid distance of the eccentric circle.

6. The integrated axle assembly according to claim 1, characterized in that the height of the upper surface of said gas spring transition plate mounting tab is higher than the height of the upper surface of the upper support plate, and said gas spring transition plate mounting tab is provided with gas spring bolt mounting holes and two gas spring transition plate mounting holes, respectively, and said gas spring bolt mounting holes are disposed between the two gas spring transition plate mounting holes.

7. An integrated axle assembly characterized in that said integrated axle assembly comprises:
an axle tube assembly extending in a first direction;
a front support arm extending circumferentially from the axle tube assembly in a second direction perpendicular to the first direction for attachment to the frame;
a rear support arm extending circumferentially from the axle tube assembly in a third direction away from the second direction for mounting a resilient assembly;
and a brake base plate extending in a peripheral direction from the circumference of the axle tube assembly;
said axle tube assembly, front bracket arm, rear bracket arm and brake base plate are molded in one piece.

8. The integrated axle assembly according to claim 7, characterized in that said axle tube assembly is longitudinally cylindrical.

9. The integrated axle assembly according to claim 7, characterized in that said axle tube assembly is a longitudinally square cylinder.

10. The integrated axle assembly according to claim 7, characterized in that said axle tube assembly is a longitudinal I-bar.

11. The integrated axle assembly according to claim 7, characterized in that said axle tube assembly is a longitudinal groove structure.

12. The integrated axle assembly according to claim 7, characterized in that said axle tube assembly is a longitudinal groove structure, and the groove is provided with a network of distributed reinforcement bars.

13. The integrated axle assembly according to claim 7, characterized in that said axle tube assembly is a longitudinal groove structure, and the cross-section of the groove structure is a three-sided encompassing structure.

14. The integrated axle assembly according to claim 13, characterized in that said groove opening is oriented in a third direction or towards the frame.

15. The integrated axle assembly according to claim 7, characterized in that said front support arm is provided as a hollow cylinder structure with reinforcement bars at appropriate positions.

16. The integrated axle assembly according to claim 7, characterized in that said front support arm is provided as a groove structure having a first groove wall and a second groove wall extending in a second direction, and transverse reinforcement bars connecting the first groove wall and the second groove wall.

17. The integrated axle assembly according to claim 7, characterized in that said front support arm is provided as a recess structure having a first groove wall and a second groove wall extending in a second direction, a transverse reinforcing bar connecting the first groove wall and the second groove wall, and a longitudinal reinforcing bar extending in a direction substantially in line with the direction of the first groove wall.

18. The integrated axle assembly according to claim 7, characterized in that said front support arm has a hollow cylinder structure.

19. The integrated axle assembly according to claim 7, characterized in that said front support arm adopts an I-bar structure.

20. The integrated axle assembly according to claim 7, characterized in that said front support arm adopts a longitudinal groove, and a folded edge structure is provided on both sides of the groove wall.

21. The integrated axle assembly according to claim 7, characterized in that said rear support arm is a horn structure which gradually contracts along the third direction space.

22. The integrated axle assembly according to claim 7, characterized in that said rear support arm adopts a groove structure, having a third groove wall and a fourth groove wall extending along the third direction, and a transverse reinforcement connecting the third groove wall and the fourth groove wall.

23. The integrated axle assembly according to claim 7, characterized in that said rear support arm adopts a groove structure and the rear support arm is set up as a prismatic projection structure, the prismatic projection extends in the third direction and splits into two at an appropriate position to form a fork-shaped prismatic projection.

24. The integrated axle assembly according to claim 7, characterized in that said rear support arm is provided as a structure having a bottom wall, a top wall, and an intermediate wall in connecting a middle part of the bottom wall to a middle part of the top wall.

25. The integrated axle assembly according to claim 7, characterized in that said axle tube assembly comprises two segments nested together in a sleeve.

26. The integrated axle assembly according to claim 7, characterized in that said rear support arm is threaded to mate with the axle tube assembly and has at least two mounting positions.

27. The integrated axle assembly according to claim 7, characterized in that said rear support arm integrates a mount for a damper.

28. The integrated axle assembly according to claim 7, characterized in that said rear support arm is provided with mounting holes for the damper.

29. The integrated axle assembly according to claim 7, characterized in that said brake base plate for mounting brake shoes for drum brakes or caliper brackets for mounting disc brakes.

30. A structural assembly having an integrated axle assembly, characterized in that said structural assembly comprises:
   an integrated axle assembly comprising:
   an axle tube assembly extending in a first direction;
   a front support arm extending circumferentially from the axle tube assembly in a second direction perpendicular to the first direction for attachment to the frame;
   a rear support arm extending circumferentially from the axle tube assembly in a third direction away from the second direction for mounting a resilient assembly;
   and a brake base plate extending in a peripheral direction from the circumference of the axle tube assembly;
   said axle tube assembly, front bracket arm, rear bracket arm and brake base plate are molded in one piece; and
   said structural assembly further comprises:
      a damper for mating with the frame at one end and mating with the integrated axle assembly at the other end;
      an air spring assembly carried on the rear support arm and for mating with the frame.

31. The structural assembly according to claim 30, characterized in that said structural assembly further comprises:
   a brake mated to a brake base plate;
   a linkage system mounted to the axle tube assembly, mating with the brake and selectively switching the brake between a braked state and a free state;
   an air chamber mated to the linkage system and providing braking force.

32. The structural assembly according to claim 31, characterized in that said brake comprises:
   a brake drum coupled to a brake base plate;
   brake shoes embedded in the brake drum and oscillating relative to the inner wall of the brake drum;
   a reset spring providing a resetting force for the brake shoe;
   a camshaft mounted to the brake base plate and driving the brake shoe to oscillate.

33. The structural assembly according to claim 31, characterized in that said brake comprises:
   a caliper bracket connected to the brake base plate;
   a brake disk partially seated into the caliper bracket;
   a caliper mounted to the caliper bracket, selectively proximate or remote from the brake disk.

* * * * *